US012478854B1

(12) United States Patent
Joseph

(10) Patent No.: US 12,478,854 B1
(45) Date of Patent: Nov. 25, 2025

(54) BASKETBALL PASSING SYSTEM PROVIDING VIRTUAL DRILL INSTRUCTIONS

(71) Applicant: Shoot-A-Way, Inc., Upper Sandusky, OH (US)

(72) Inventor: John G. Joseph, Upper Sandusky, OH (US)

(73) Assignee: Shoot-A-Way, Inc., Upper Sandusky, OH (US)

(*) Notice: Subject to any disclaimer, the term of this patent is extended or adjusted under 35 U.S.C. 154(b) by 0 days.

(21) Appl. No.: 18/817,760

(22) Filed: Aug. 28, 2024

Related U.S. Application Data

(63) Continuation of application No. 18/145,402, filed on Dec. 22, 2022, now Pat. No. 12,390,713, which is a (Continued)

(51) Int. Cl.
*A63B 71/06* (2006.01)
*A63B 63/08* (2006.01)
(Continued)

(52) U.S. Cl.
CPC ........ *A63B 71/0622* (2013.01); *A63B 63/083* (2013.01); *A63B 69/0071* (2013.01);
(Continued)

(58) Field of Classification Search
CPC . A63B 71/0622; A63B 69/0071; A63B 69/40; A63B 71/0605; A63B 2071/0647;
(Continued)

(56) References Cited

U.S. PATENT DOCUMENTS

| | | | |
|---|---|---|---|
| 435,964 | A | 9/1890 | Compton |
| 1,223,386 | A | 4/1917 | Handelan |

(Continued)

FOREIGN PATENT DOCUMENTS

| | | |
|---|---|---|
| CN | 303127130 | 3/2015 |
| CN | 303207615 | 5/2015 |

(Continued)

OTHER PUBLICATIONS

The Gun 6000 Series, Shoot-A-Way, Inc. Upper Sandusky, Ohio, http://www.shootaway.com/Gun1.htm/, at least as early as Jun. 2000.

(Continued)

*Primary Examiner* — Malina D. Blaise
(74) *Attorney, Agent, or Firm* — Standley Law Group LLP; Adam J. Smith; Jeffrey S. Standley

(57) ABSTRACT

A basketball passing machine providing a multi-user mode and related systems and methods are provided. A controller receives programming information for a basketball practice drill including participant information for multiple users. Based on the programming information received, each pass in the basketball practice drill is associated with a respective one of the multiple users. A launching device passes basketballs to locations at a basketball playing area, and participant information is displayed at the front display for an associated one of the users for a respective one of the passes.

20 Claims, 23 Drawing Sheets

Related U.S. Application Data continuation-in-part of application No. 17/126,855, filed on Dec. 18, 2020, now Pat. No. 12,029,960.

(60) Provisional application No. 62/951,282, filed on Dec. 20, 2019.

(51) Int. Cl.
*A63B 69/00* (2006.01)
*A63B 69/40* (2006.01)
*A63B 71/02* (2006.01)
*A63B 63/00* (2006.01)
*H04L 67/12* (2022.01)

(52) U.S. Cl.
CPC .............. *A63B 69/40* (2013.01); *A63B 71/03* (2020.08); *A63B 71/0605* (2013.01); *A63B 2063/001* (2013.01); *A63B 2071/0675* (2013.01); *A63B 2071/0694* (2013.01); *A63B 2210/50* (2013.01); *A63B 2214/00* (2020.08); *A63B 2220/807* (2013.01); *A63B 2225/093* (2013.01); *H04L 67/12* (2013.01)

(58) Field of Classification Search
CPC ........ A63B 2071/0694; A63B 2210/50; A63B 2220/62; A63B 2220/807; A63B 2225/093; A63B 2225/20; A63B 2230/06; G06F 3/04817; G06F 3/0482
See application file for complete search history.

(56) References Cited

U.S. PATENT DOCUMENTS 2,650,585 A 9/1953 Farre, Jr.
2,655,908 A 10/1953 Calleo
2,696,204 A 12/1954 Gilgoff
D174,027 S 2/1955 Farkas
2,908,266 A 10/1959 Cooper
D204,309 S 4/1966 Murray
3,776,550 A 12/1973 McNabb
3,802,703 A 4/1974 Van Tassel
3,878,828 A 4/1975 Francesco
4,168,695 A 9/1979 Haller et al.
4,262,648 A 4/1981 Wegener et al.
4,269,163 A 5/1981 Feith
4,391,264 A 7/1983 Abraham et al.
4,471,746 A 9/1984 Ando
4,579,340 A 4/1986 Jenkins et al.
4,611,571 A 9/1986 Tressler et al.
D287,854 S 1/1987 Crews
4,667,957 A 5/1987 Joseph
4,678,189 A 7/1987 Koss
4,714,248 A 12/1987 Koss
4,717,149 A 1/1988 Juhl
4,913,431 A 4/1990 Jakobs
4,936,577 A 6/1990 Kington et al.
4,940,231 A 7/1990 Ehler
4,955,605 A 9/1990 Goldfarb
4,995,371 A 2/1991 Kuizinas
5,016,875 A 5/1991 Joseph
5,039,977 A 8/1991 Mele et al.
5,121,735 A 6/1992 Hancock
5,125,651 A 6/1992 Keeling et al.
5,312,099 A 5/1994 Oliver, Sr.
5,342,041 A * 8/1994 Agulnek ............ A63B 24/0003 473/446
5,365,427 A 11/1994 Soignet et al.
5,393,049 A 2/1995 Nelson
5,409,211 A 4/1995 Adamek
5,417,196 A 5/1995 Morrison et al.
5,418,517 A 5/1995 Matherne et al.
5,450,540 A 9/1995 Spohrer et al.
5,540,428 A 7/1996 Joseph
5,562,282 A 10/1996 Stevenson
5,619,977 A 4/1997 Gatin
5,647,747 A 7/1997 Macri et al.
5,676,120 A 10/1997 Joseph
5,681,230 A 10/1997 Krings
5,746,668 A 5/1998 Ochs
5,768,151 A 6/1998 Lowy et al.
5,776,018 A 7/1998 Simpson et al.
5,807,195 A * 9/1998 Westbrook ........... A63B 63/083 473/447
5,813,926 A 9/1998 Vance
5,816,953 A 10/1998 Cleveland
5,842,699 A 12/1998 Mirando et al.
5,911,214 A * 6/1999 Andrews .............. A63B 69/408 124/16
6,224,503 B1 5/2001 Joseph
6,241,628 B1 * 6/2001 Jenkins .............. A63B 69/0071 473/436
D445,426 S 7/2001 Wang et al.
6,280,352 B1 8/2001 Coffeen et al.
6,389,368 B1 5/2002 Hampton
6,659,893 B1 12/2003 Campbell et al.
6,707,487 B1 3/2004 Aman et al.
6,715,478 B1 4/2004 Tanner
6,731,316 B2 5/2004 Herigstad et al.
6,746,397 B2 6/2004 Lee et al.
6,918,591 B2 7/2005 D'Amico et al.
7,094,164 B2 8/2006 Marty et al.
7,111,620 B2 9/2006 Johndreau et al.
D554,661 S 11/2007 Hoover et al.
D554,662 S 11/2007 Hoover et al.
D591,305 S 4/2009 Shimoda
7,620,466 B2 11/2009 Neale et al.
7,802,699 B1 9/2010 Hoy
7,850,552 B2 12/2010 Marty et al.
7,854,669 B2 12/2010 Marty et al.
7,882,831 B2 2/2011 Alger
7,927,237 B2 4/2011 Jenkins et al.
D637,199 S 5/2011 Brinda et al.
7,938,746 B2 5/2011 Chipperfield
8,012,046 B2 9/2011 Campbell et al.
8,016,687 B2 9/2011 Martin et al.
8,123,634 B1 2/2012 Lovett
8,133,137 B2 3/2012 Grant et al.
8,147,356 B2 4/2012 Campbell et al.
8,206,246 B2 6/2012 Joseph et al.
8,286,619 B2 10/2012 Mihaljevic
8,408,982 B2 4/2013 Marty et al.
8,409,024 B2 4/2013 Marty et al.
D681,662 S 5/2013 Fletcher et al.
D687,845 S 8/2013 Lee
8,540,560 B2 9/2013 Crowley et al.
D690,728 S 10/2013 Brinda
8,579,632 B2 11/2013 Crowley
8,617,008 B2 12/2013 Marty et al.
8,622,832 B2 1/2014 Marty et al.
D704,734 S 5/2014 Wafapoor
8,727,784 B1 5/2014 Wolf
D714,321 S 9/2014 Pereira
D714,325 S 9/2014 Pereira
8,852,030 B2 10/2014 Campbell et al.
8,854,457 B2 10/2014 De Vleeschouwer et al.
8,908,922 B2 12/2014 Marty et al.
8,948,457 B2 2/2015 Marty et al.
9,010,309 B2 * 4/2015 Lewis .................... A63B 69/40 124/78
9,015,627 B2 4/2015 Lai
9,017,188 B2 4/2015 Joseph et al.
D729,488 S 5/2015 Pulskamp et al.
9,086,257 B2 * 7/2015 Laporte ...................... F41J 9/20
D737,278 S 8/2015 Shin et al.
D739,488 S 9/2015 Campbell et al.
D745,533 S 12/2015 Luo
D746,855 S 1/2016 Choi
9,233,292 B2 1/2016 Joseph et al.
9,238,164 B2 1/2016 Perry, Jr.
9,238,165 B2 1/2016 Marty et al.
9,248,368 B2 2/2016 Stimac
9,254,432 B2 2/2016 Tanni et al.
9,283,431 B2 3/2016 Marty et al.

(56) References Cited

U.S. PATENT DOCUMENTS

| | | | | |
|---|---|---|---|---|
| 9,283,432 | B2 | 3/2016 | Marty et al. | |
| 9,345,929 | B2 | 5/2016 | Marty et al. | |
| 9,358,455 | B2 | 6/2016 | Marty et al. | |
| 9,370,704 | B2 | 6/2016 | Marty | |
| D760,769 | S | 7/2016 | Ishii et al. | |
| D761,840 | S | 7/2016 | Patterson et al. | |
| 9,390,501 | B2 | 7/2016 | Marty et al. | |
| D762,709 | S | 8/2016 | Hsieh | |
| D767,596 | S | 9/2016 | Shi | |
| 9,452,339 | B1 | 9/2016 | Shah et al. | |
| D768,143 | S | 10/2016 | Drozd et al. | |
| D768,148 | S | 10/2016 | Jung et al. | |
| 9,474,953 | B1 | 10/2016 | Duke | |
| D774,518 | S | 12/2016 | Lv | |
| D776,676 | S | 1/2017 | Shi | |
| D778,314 | S | 2/2017 | Li et al. | |
| D783,659 | S | 4/2017 | Park | |
| D786,269 | S | 5/2017 | Lin et al. | |
| 9,656,140 | B2 | 5/2017 | Thurman et al. | |
| D789,393 | S | 6/2017 | Jaini et al. | |
| D790,585 | S | 6/2017 | Kim et al. | |
| 9,687,713 | B1 | 6/2017 | Duke | |
| D791,786 | S | 7/2017 | Chauhri et al. | |
| 9,694,238 | B2 | 7/2017 | Marty et al. | |
| 9,697,617 | B2 | 7/2017 | Marty et al. | |
| 9,724,584 | B1 * | 8/2017 | Campbell | A63B 69/0071 |
| 9,734,405 | B2 | 8/2017 | Marty et al. | |
| 9,808,696 | B2 * | 11/2017 | Campbell | A63B 71/0616 |
| D808,976 | S | 1/2018 | Shi | |
| 9,886,624 | B1 | 2/2018 | Marty et al. | |
| 9,914,035 | B2 | 3/2018 | Campbell et al. | |
| D817,348 | S | 5/2018 | Ishikawa et al. | |
| D818,488 | S | 5/2018 | Frazier | |
| 9,975,026 | B2 | 5/2018 | Campbell et al. | |
| 10,004,949 | B2 | 6/2018 | Brothers et al. | |
| 10,010,778 | B2 | 7/2018 | Marty et al. | |
| D824,955 | S | 8/2018 | Lee et al. | |
| 10,092,793 | B1 | 10/2018 | Marty et al. | |
| D838,729 | S | 1/2019 | Guerrieri et al. | |
| 10,252,128 | B2 | 4/2019 | Lewis et al. | |
| 10,252,133 | B2 | 4/2019 | Campbell et al. | |
| 10,315,090 | B2 | 6/2019 | Campbell et al. | |
| 10,343,015 | B2 * | 7/2019 | Marty | A63B 71/0669 |
| 10,360,685 | B2 | 7/2019 | Marty et al. | |
| D861,720 | S | 10/2019 | Koller et al. | |
| 10,471,325 | B2 | 11/2019 | Marty et al. | |
| 10,471,330 | B1 | 11/2019 | Hart | |
| 10,489,656 | B2 | 11/2019 | Lee et al. | |
| 10,537,780 | B2 | 1/2020 | Joseph et al. | |
| 10,561,916 | B1 | 2/2020 | Campbell et al. | |
| 10,596,436 | B1 * | 3/2020 | Campbell | A63B 69/0071 |
| 10,600,334 | B1 | 3/2020 | Zhang et al. | |
| 10,603,568 | B2 | 3/2020 | Palanethra et al. | |
| 10,610,757 | B1 | 4/2020 | Marty | |
| 10,688,362 | B1 * | 6/2020 | Sangalang | A63B 63/06 |
| 10,762,642 | B2 | 9/2020 | Marty et al. | |
| 10,806,986 | B2 * | 10/2020 | Moore | A63B 47/02 |
| 10,898,782 | B2 | 1/2021 | Circosta | |
| 10,994,182 | B1 | 5/2021 | Campbell et al. | |
| 11,077,353 | B1 | 8/2021 | Kamstra et al. | |
| 11,097,176 | B1 | 8/2021 | Campbell et al. | |
| 11,123,605 | B1 | 9/2021 | Marty | |
| 11,135,500 | B1 * | 10/2021 | Campbell | A63B 63/083 |
| 11,247,109 | B1 | 2/2022 | Campbell et al. | |
| 11,247,111 | B2 | 2/2022 | Harvey, Jr. et al. | |
| 11,380,100 | B2 | 7/2022 | Lee et al. | |
| 11,450,106 | B2 | 9/2022 | Marty et al. | |
| 11,491,383 | B1 * | 11/2022 | Campbell | A63B 69/407 |
| D972,675 | S | 12/2022 | Campbell et al. | |
| 11,577,139 | B1 * | 2/2023 | Campbell | A63B 69/407 |
| 11,715,214 | B1 | 8/2023 | Marty et al. | |
| 11,813,510 | B1 * | 11/2023 | Campbell | A63B 71/03 |
| 11,890,521 | B1 | 2/2024 | Campbell et al. | |
| 11,896,884 | B2 | 2/2024 | Marty et al. | |
| 2002/0010032 | A1 | 1/2002 | Stiteler | |
| 2003/0023145 | A1 | 1/2003 | Lee et al. | |
| 2005/0143154 | A1 | 6/2005 | Bush | |
| 2006/0068945 | A1 | 3/2006 | Murchison, III | |
| 2006/0160639 | A1 | 7/2006 | Klein | |
| 2006/0236993 | A1 | 10/2006 | Cucjen et al. | |
| 2007/0026974 | A1 | 2/2007 | Marty et al. | |
| 2007/0026975 | A1 | 2/2007 | Marty et al. | |
| 2007/0173355 | A1 | 7/2007 | Klein | |
| 2007/0232419 | A1 | 10/2007 | Kosjer | |
| 2007/0265138 | A1 | 11/2007 | Ashby | |
| 2008/0015061 | A1 | 1/2008 | Klein | |
| 2008/0200287 | A1 | 8/2008 | Marty et al. | |
| 2008/0254866 | A1 | 10/2008 | Young et al. | |
| 2008/0261726 | A1 | 10/2008 | Chipperfield | |
| 2008/0312010 | A1 | 12/2008 | Marty et al. | |
| 2009/0042672 | A1 | 2/2009 | Radice | |
| 2009/0045578 | A1 | 2/2009 | Wang | |
| 2009/0137347 | A1 * | 5/2009 | Jenkins | A63B 69/0071 473/433 |
| 2010/0259412 | A1 | 10/2010 | Pagonakis | |
| 2010/0261557 | A1 | 10/2010 | Joseph et al. | |
| 2011/0013087 | A1 | 1/2011 | House et al. | |
| 2011/0071818 | A1 | 3/2011 | Jiang | |
| 2011/0214651 | A1 | 9/2011 | Woessner et al. | |
| 2011/0294585 | A1 | 12/2011 | Penna et al. | |
| 2011/0303207 | A1 | 12/2011 | Shober et al. | |
| 2012/0115651 | A1 | 5/2012 | Chipperfield | |
| 2012/0322587 | A1 | 12/2012 | Duke | |
| 2013/0095959 | A1 | 4/2013 | Marty et al. | |
| 2013/0095961 | A1 | 4/2013 | Marty | |
| 2013/0130845 | A1 | 5/2013 | Marty et al. | |
| 2013/0172058 | A1 | 7/2013 | Marty et al. | |
| 2014/0092253 | A1 | 4/2014 | Marty et al. | |
| 2014/0121043 | A1 | 5/2014 | Blanning | |
| 2014/0135956 | A1 | 5/2014 | Thurman et al. | |
| 2014/0195019 | A1 | 7/2014 | Thurman et al. | |
| 2014/0195022 | A1 | 7/2014 | Thurman et al. | |
| 2014/0200692 | A1 | 7/2014 | Thurman et al. | |
| 2014/0222177 | A1 | 8/2014 | Thurman et al. | |
| 2014/0266160 | A1 * | 9/2014 | Coza | A63B 47/008 324/207.11 |
| 2014/0283142 | A1 | 9/2014 | Shepherd et al. | |
| 2014/0301601 | A1 | 10/2014 | Marty et al. | |
| 2014/0305420 | A1 | 10/2014 | Deese | |
| 2014/0344698 | A1 * | 11/2014 | Hohteri | G06F 3/0488 715/720 |
| 2015/0028541 | A1 | 1/2015 | Murakami et al. | |
| 2015/0131845 | A1 * | 5/2015 | Forouhar | G06V 20/44 382/100 |
| 2015/0141144 | A1 | 5/2015 | Sprague et al. | |
| 2015/0248917 | A1 | 9/2015 | Chang | |
| 2015/0258416 | A1 * | 9/2015 | Lanni | G06V 40/23 700/91 |
| 2015/0265897 | A1 | 9/2015 | Gordon et al. | |
| 2015/0290516 | A1 | 10/2015 | Joseph et al. | |
| 2015/0352425 | A1 * | 12/2015 | Lewis | A63B 71/0619 124/78 |
| 2015/0382076 | A1 * | 12/2015 | Davisson | H04N 21/435 725/62 |
| 2016/0082340 | A1 | 3/2016 | Adams | |
| 2016/0121193 | A1 | 5/2016 | Marty et al. | |
| 2016/0166907 | A1 | 6/2016 | Joseph et al. | |
| 2016/0193518 | A1 | 7/2016 | Baxter et al. | |
| 2016/0193520 | A1 | 7/2016 | Hart | |
| 2016/0250536 | A1 | 9/2016 | Hart | |
| 2016/0250540 | A1 | 9/2016 | Joseph et al. | |
| 2016/0287964 | A1 | 10/2016 | Jones | |
| 2016/0310814 | A1 | 10/2016 | Joseph et al. | |
| 2016/0325168 | A1 * | 11/2016 | Campbell | A63B 69/408 |
| 2016/0354664 | A1 * | 12/2016 | DeCarlo | F41J 5/02 |
| 2017/0007921 | A1 | 1/2017 | Baba et al. | |
| 2017/0095716 | A1 | 4/2017 | Lewis et al. | |
| 2017/0136333 | A1 | 5/2017 | Joseph et al. | |
| 2017/0157482 | A1 * | 6/2017 | DeCarlo | A63B 63/083 |
| 2017/0161561 | A1 | 6/2017 | Marty et al. | |
| 2017/0232298 | A1 * | 8/2017 | Joseph | A63B 69/40 473/433 |
| 2017/0282044 | A1 | 10/2017 | Moore et al. | |

(56) References Cited

U.S. PATENT DOCUMENTS

| | | | | |
|---|---|---|---|---|
| 2017/0340943 | A1* | 11/2017 | Pierotti | A63B 24/0087 |
| 2017/0340949 | A1 | 11/2017 | Tsai | |
| 2018/0056124 | A1* | 3/2018 | Marty | A63B 69/0071 |
| 2018/0099201 | A1* | 4/2018 | Marty | G06V 40/23 |
| 2018/0322337 | A1 | 11/2018 | Marty et al. | |
| 2019/0087661 | A1* | 3/2019 | Lee | G06V 10/82 |
| 2019/0224555 | A1 | 7/2019 | Ward | |
| 2019/0329114 | A1 | 10/2019 | Marty et al. | |
| 2020/0074181 | A1 | 3/2020 | Chang | |
| 2020/0098113 | A1 | 3/2020 | Marty et al. | |
| 2020/0364462 | A1 | 11/2020 | Imes | |
| 2021/0166010 | A1 | 6/2021 | Marty et al. | |
| 2022/0122269 | A1 | 4/2022 | Marty et al. | |
| 2022/0212077 | A1 | 7/2022 | Anton et al. | |
| 2022/0288451 | A1 | 9/2022 | Hebbale et al. | |
| 2022/0415048 | A1 | 12/2022 | Marty et al. | |
| 2024/0071140 | A1 | 2/2024 | Marty et al. | |
| 2024/0087137 | A1 | 3/2024 | Marty et al. | |
| 2024/0252886 | A1 | 8/2024 | Marty et al. | |
| 2024/0252917 | A1 | 8/2024 | Marty et al. | |

FOREIGN PATENT DOCUMENTS

| | | | |
|---|---|---|---|
| EP | 2271414 | B1 | 6/2014 |
| RU | 2026104 | | 1/1995 |
| WO | 9530872 | A1 | 11/1995 |
| WO | 9532033 | | 11/1995 |
| WO | 0125946 | A1 | 4/2001 |
| WO | 2005062841 | | 7/2005 |
| WO | 2009126982 | A2 | 10/2009 |

OTHER PUBLICATIONS

Dr. Dish™, Airborne Athletics Inc., Belle Plaine, Minnesota, http://www.drdishbasketball.com/, at least as early as Jul. 29, 2003.

iMake ™, Airborne Athletics Inc., Belle Plaine, Minnesota, www.imakebasketball.com. (The iMake has a menu drive programming board allowing the user to select a shooting range by selecting a left and a right limit. The user is given the ability to select spots between said shooting range in spaced increments for the machine to fire balls in that direction.) At least as early as Jun. 2008.

Vorelco, The Sniper Basketball Training System, https://www.youtube.com/watch?v=X9SqMy8xdf4, Uploaded on Jul. 5, 2008.

Brochure entitled "Sniper: The Ultimate Basketball Trainer." before Oct. 22, 1995, 5 pages including the cover letter.

ECoach, Learn From the Best Minds in Basketball and Grow Your Game, https://ecoachsports.com/basketball-old/, site accessed Aug. 28, 2019.

Sideline Scout, SideLine Live, https://sidelinescout.com/sports/basketball/, site accessed Aug. 28, 2019.

White, J., Technology Grows and Coaches Need to Grow With [It]: Remote Training Gives High School Athletes a Different Outlet, USA Today High School Sports, https://usatodayhss.com/2019/technology-grows-and-coaches-need-to-grow-with-it-remote-training-gives-high-school-athletes-a-different-outlet, Jul. 4, 2019.

HomeCourt, https://www.homecourt.ai/, site accessed Aug. 28, 2019.

Airborne Athletics, Inc., www.imakebasketball.com/training_features.html, Jun. 2008, visited Feb. 3, 2016 via http://web.archive.com/web/20080608033916/http://www.imakebasketball.com/training_features.html.

Airborne Athletics, Inc., www.airborneathletics.com/imake-basketball-machine.php, Feb. 2011, visited Feb. 3, 2016 via http://web.archive.org/web/20110213020947http://www.airborneathletics.com/imake-basketball-machine.php.

Airborne Athletics, Inc., www.drdishbasketball.com, visited Mar. 1, 2016.

Airborne Athletics, Inc., Dr. Dish Display, Available Apr. 2015.

Control Panel shown on webpage: https://web.archive.org/web/20130111040129/https://www.winners-choice.net/gun-8000.html, Web Archive Capture date: Oct. 11, 2013 (accessed on Feb. 24, 18) (Year: 2013).

Shoot-A-Way, Inc., www.shootaway.com, visited Mar. 1, 2016.

Dr. Dish Owner's Manual, Airborne Athletics, Inc., 2005.

Reich, B. et al., A Spatial Analysis of Basketball Shot Chart Data, the American Statistician, Feb. 2006, vol. 60 No. 1.

Sniper, First Advanced Basketball Training Device, 2009.

BSN Sports, Hot Shot Basketball Shooting Machine, https://www.bsnsports.com/hot-shot-basketball-shooting-machine, site accessed Mar. 9, 2021.

MYOM, MYOM Basketball Shooting Gun Basketball Rebounder Machine—Best Basketball Shooting Trainer, https://www.amazon.com/MYOM-Basketball-Shooting-Rebounder-Machine/dp/B07HBN5X81, site accessed Mar. 9, 2021.

Siboasi, Basketball Passing Machine S6839, https://www.siboasi.com/basketball-passing-machine-s6839.html, site accessed Mar. 9, 2021.

Siboasi, Siboasi S6839 Programmable Basketball Shooting Machine, https://www.youtube.com/watch?v=ZjzTnaLOccY&t=16s, Jun. 1, 2019.

United States Patent and Trademark Office, Patent Trial and Appeal Board, Decision on Appeal, Appeal No. 2024-003560 mailed Oct. 22, 2024, 29 pages.

* cited by examiner

BASKETBALL PASSING SYSTEM PROVIDING VIRTUAL DRILL INSTRUCTIONS

CROSS-REFERENCE TO RELATED APPLICATION

This application is a continuation of U.S. application Ser. No. 18/145,402 filed Dec. 22, 2022, which is a continuation-in-part of U.S. application Ser. No. 17/126,855 filed Dec. 18, 2020, which claims the benefit of U.S. provisional patent application Ser. No. 62/951,282 filed Dec. 20, 2019, the disclosures of which are hereby incorporated by reference as if fully restated herein.

TECHNICAL FIELD

Exemplary embodiments of the present invention relate generally to basketball passing system providing virtual coaching capabilities, such as video instruction.

BACKGROUND AND SUMMARY OF THE INVENTION

Basketball passing devices are used to return basketballs to one or more users positioned about some or all of a basketball playing area, such as a basketball court. For example, a user may position himself or herself at various locations around the basketball playing area to practice shooting the basketball from such locations. Normally, the user would be required to manually retrieve shots made towards the basketball goal. However, a basketball passing device may be used to capture some or all of the made or missed shots and return the captured basketballs to various locations at the basketball playing area to facilitate repetitive shooting practice. Some such devices rely on gravity to pass the basketball to the user. Other devices use machines which automate the return passes. Such machines may also track shooting statistics to give the user feedback on their progress. An example of a basketball passing device is THE GUN® line of products, such as THE GUN 6000, THE GUN 8000, and THE GUN 10K, available from Shoot-A-Way, Inc. in Upper Sandusky, Ohio (http://shootaway.com/).

Conventionally, a player evaluates his or her own performance and/or has a third party, such as a coach, trainer, friend, family member, and/or other individual(s) (hereinafter referred to generally as a "coach") visually observe and evaluate the player's performance. However, it is difficult for a player to evaluate their own performance and, for one reason or another, such third parties may not always be available to evaluate a basketball player at the time of his/her performance. Therefore, what is needed is a basketball passing machine with virtual coaching capabilities.

These disclosures provide a basketball passing machine with virtual coaching capabilities. The basketball passing machine may comprise a launching device. The launching device may be located within a housing and/or mounted to a frame. The housing and/or the launching device may be mounted to a platform in a manner which facilitates pivoting and/or rotation. The launching device may be configured to pass the basketballs to various pass receipt locations on a basketball playing area. A frame may extend vertically behind the housing and/or from the platform. The frame may support a net configured to facilitate the capture of made or missed basketball shots and deliver the captured basketballs to the basketball launching device. Some or all of the frame may be adjustable such that the net may be collapsible and/or the height of the net may be adjusted. In exemplary embodiments, the net may be capable of extending above a rim of a regulation height basketball goal, such as a 10-foot rim.

The basketball passing machine may comprise an interface configured to receive user input for programming the basketball passing machine. The interface may comprise a panel, an electronic display, a touch screen, combinations thereof, or the like. The interface may comprise a series of indicia. The indicia may comprise buttons, electronic icons, selectable areas, combinations thereof, or the like. The indicia may be provided in a spaced apart arrangement at various locations at a rendering of a basketball playing area. The locations of the indicia on the rendering may correspond with pass receipt locations on the basketball playing area. The user may select the indicia corresponding to the pass receipt locations the user desires to receive basketball passes. The indicia may be visible before and/or after selection at the interface.

Alternatively, or additionally, the interface may comprise a visual depiction of an exemplary basketball playing area and the user may select one or more indicia on the rendering where the user would like to receive a pass. Indicia may be provided at the interface to represent the selected pass receipt location(s). Upon the selection of one or more indicia, a processor in electronic communication with the interface may cause a launching mechanism to launch the basketballs to the locations on the basketball playing area corresponding with the selected indicia. In other exemplary embodiments, the indicia are not visible until an area is selected at the interface.

The direction and/or distance the basketball is passed may be automatically adjusted by the launching device to throw the basketballs to the locations on the basketball playing area corresponding with the indicia selected by the user. For example, without limitation, if a user selects pass receipt locations to the left and right of the key, the launching device may be rotated to direct the basketballs in the appropriate direction. As a further example, without limitation, if a user selects a pass receipt location inside of a rendering of a three-point line, the basketballs may be thrown with less force such that they travel a shorter distance. If a user selects a pass receipt location outside of a rendering of the three-point line, the basketballs may be thrown with greater force such that they travel a further distance. In other exemplary embodiments, a distance selection tool located on, or adjacent to, the interface may permit the distance of the basketball passes to be set by the user. In yet other exemplary embodiments, the distance and/or amount of force the basketball is passed with may not change, but the shot may be associated with a different potential score amount based on the location and/or distance of the selected pass receipt location.

The interface may be located on a housing for the basketball ejection device. In other exemplary embodiments, the interface may be located on the frame. Alternatively, or in addition, the interface may be located on a personal electronic device. Any location of the interface may be utilized. Selection of the pass receipt locations may be made directly at the interface, such as but not limited to, by physical depression or other actuation of buttons, physical touch of the buttons at a panel, physical touch of a touch screen, or the like. In other exemplary embodiments, selection of the pass receipt locations may be made indirectly by way of one or more indirect selection devices, such as but not limited to, verbal commands, gestures, number pads, arrows keys, mouse, stylus, joystick, buttons combinations thereof, or the like.

One or more cameras may be mounted to the basketball passing machine, such as, but not limited to, at the housing and/or the frame. In other exemplary embodiments, the cameras may be separate from the housing and/or frame, but in electronic communication with, other components of the basketball passing machine. The cameras may be positioned to record images or videos of the user receiving basketball passes, the user attempting basketball shots, and/or the flight of the basketballs—to the user, towards the basketball goal, some combination thereof, or the like. One or more electronic displays may be mounted to the basketball passing machine, such as to the housing. The electronic displays may be configured to display images of a coach to the player. One or more microphones may be provided to detect audio from the user and/or the coach. One or more speakers may be provided to transmit audio to the user and/or the coach.

Images may be taken periodically or continuously from the cameras. In other exemplary embodiments, images may be taken only when a particular option, such as but not limited to a record feature, is selected by the user. Such images may be stored at the basketball passing machine and/or at a remote location. The user may be provided with an option to share and/or transmit images from the cameras to the coach. For example, without limitation, a share option may be provided, which when selected, may provide a prompt for the user to enter an address for transmission of the images. The images may be synched with audio gathered by the microphones and provided with the images.

The basketball passing machine may be in electronic communication with the coach by way of a remote electronic device. One or more sensors may be provided at the basketball passing machine or elsewhere, such as but not limited to at the basketball goal, and may be configured to detect whether the basketballs have successfully passed through the basketball hoop. Such sensors may comprise cameras, optical sensors, audio sensors, proximity detectors, combinations thereof, or the like. The basketball passing machine may be configured to transmit captured images, video, and audio to the remote electronic device for display to the coach. The basketball passing machine may be further configured to transmit data representing whether the user made or missed a basketball shot at a given location, overall shooting statistics, location-based shooting statistics, some combination thereof, or the like. Such data may be provided in a visualization at one or more remote electronic devices associated with the coach(es). In this way, the coach(es) may be able to track the player's performance. Such data may additionally, or alternatively, be provided at the interface and/or remote electronic devices associated with the user for self-evaluation and/or recordkeeping. This may permit the coach(es) and/or the player to monitor shooting form and know whether or not the form resulted in a successfully made shot, for example without limitation.

Sometimes, multiple users may desire to use a basketball passing machine, such as part of a common drill. In this way, players may compete against one another, such as part of a multi-user mode. For example, passes may be repeated for each of a number of players. This way, each player is presented with essentially the same passes for group participation and/or an equal comparison of performance. Of course, relatively minor variations due to natural fluctuation in ambient conditions, machine operations and wear, basketball condition, ball presentation, combinations thereof, or the like may result in relatively small changes to the presented passes. In other exemplary embodiments, substantially different passes may be presented to each player while still operating in the multi-user mode.

A front display may present various information to the players, such as a name or other identifying information for a respective player who is assigned to an upcoming, current, and/or last presented pass, such as the player who is currently making shooting attempts. In this way, the players can easily keep track of whose turn it is.

User selections for programming a drill may be made at a user interface. The drill may be a customized user drill or a pre-programmed drill. A multi-user mode may be selected during initial programming or later. Player information may be indicated for each user, such as but not limited to, name, team, facility, combinations thereof, or the like. Player information may be automatically associated with a drill by user login in exemplary embodiments, without limitation.

Sometimes, it may be desirable for a participant to especially work towards improvement in shooting accuracy at a particular location. A must-be-made option may be designated for some or all programmed pass locations for some of all programmed participants. A controller may program the machine to continue launching passes to the designated must-be-made positions until data is received indicating a made shot. Then, the controller may program the machine to instead begin passing basketballs to a next location.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1A:
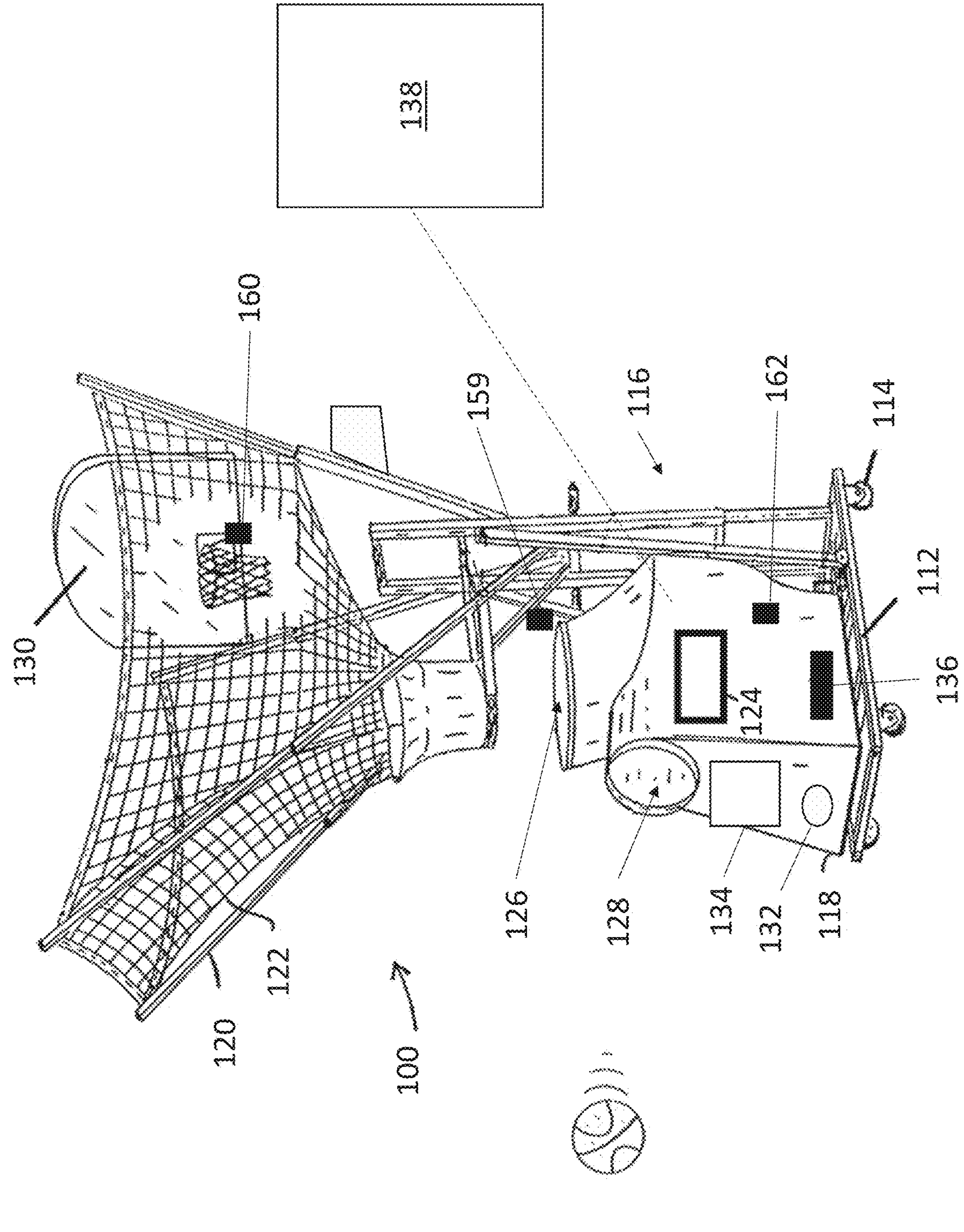
FIG. 1A is a perspective view of an exemplary basketball passing machine and remote electronic device in accordance with the present invention.
Figure 1B:
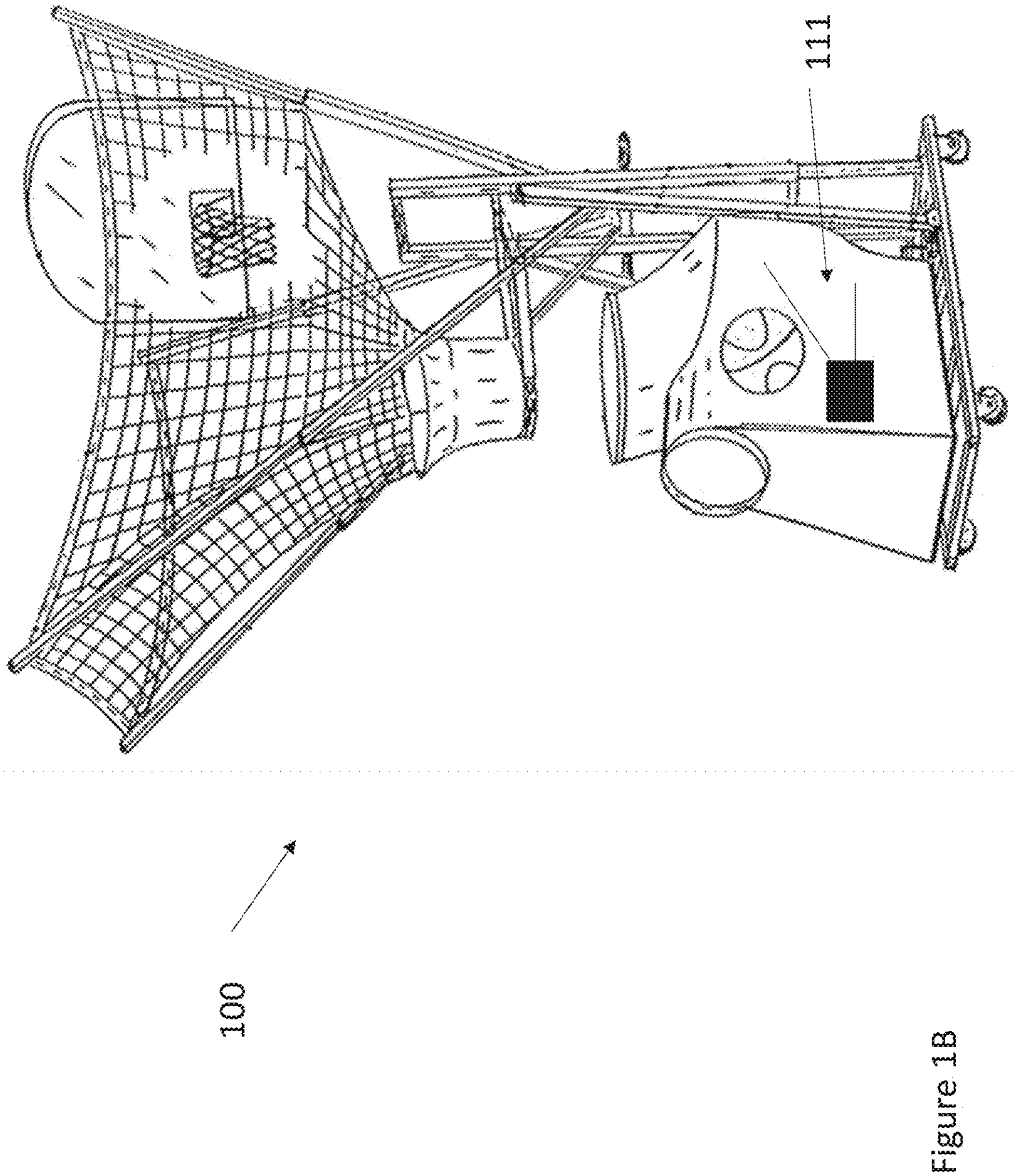
FIG. 1B is a perspective view of the exemplary basketball passing machine of FIG. 1A with certain features not illustrated and certain internal features shown.

FIG. 1A and FIG. 1B illustrate an exemplary basketball passing machine 100. The basketball launching machine 100 may comprise a platform 112. The platform 112 may comprise a number of rigid members. Alternatively, or additionally, the platform 112 may comprise one or more sheets. One or more movement devices 114, such as but not limited to wheels, treads, casters, or the like, may be connected to the platform 112 to facilitate movement of the basketball launching machine 100. Suitably rigid members and/or sheets may be selected and arranged such that the weight and size of components of the basketball launching machine 100 may be adequately supported.

The basketball launching machine 100 may comprise one or more launching devices 111. The launching devices 111 may comprise one or more catapult arms, throwing arms, striking devices, wheels, belts, combinations thereof, or the like. The launching device 111 may be configured to launch basketballs of regulation or varying sizes and weights, such as but not limited to, size 6 (i.e., 28.5-inch circumference, 20 ounce) and size 7 (i.e., 29.5-inch circumference, 22 ounce) basketballs to various pass receipt locations on some or all of a basketball playing area. The basketball playing area may comprise a basketball court, or a portion thereof, having a basketball goal, though any surface may be utilized. The launching device 111 may be at least partially enclosed within a housing 118, though such is not required.

The housing 118 may be mounted to said platform 112 and/or a frame 116. The housing 118 may be mounted to said platform 112 in a fashion which permits pivoting or other rotational movement of the housing 118 and/or the launching device 111. Stated another way, the housing 118 and launching device 111 may rotate together, or one may rotate independent of the other. Such rotational movement may be about a substantially vertical axis. Such rotation may be facilitated by the user of gears, shafts, ball bearings, turn tables, belts, motors, levers, combinations thereof, or the like. The housing 118 and/or the launching device 111 may be configured to pivot or otherwise rotate so as to direct basketballs to various pass receipt locations on the basketball playing area. Alternatively, or additionally, guides, tracks, ramps, or the like may be used to guide the pathway of the basketballs from the basketball passing machine 100.

The housing 118 may comprise a first aperture 126 for receiving basketballs. The housing 118 may comprise a second aperture 128 through which basketballs may be launched. The basketballs may be stored inside or outside of the housing 118 before being launched. In some cases, the first and/or second apertures 126 and 128 may not be required, such as where the basketballs are fed to the launcher 111 and exit from the launcher 111 through the same aperture 126 or 128. The first aperture 126 may be located on an upper portion of the housing 118. The second aperture 128 may be located on a side of the housing 118, such as but not limited to the front side. Those skilled in the art will appreciate, however, that other embodiments of the basketball launching machine 100 may include first and second apertures 126, 128 at different locations than in the embodiment shown, and may do so without departing from the scope of the present disclosure. Furthermore, while a housing 118 may be desired to provide a degree of protection to the internal components of the basketball launching machine, the housing 118 may not be required, or may not cover certain portions of the basketball launching machine 100. Any number of apertures of various size, shape, and location may be utilized.

The frame 116 may be mounted to the platform 112 and/or housing 118. At least a first portion of the frame 116 may extend vertically from the platform 112. The frame 116 may comprise a number of rigid members. In exemplary embodiments, the frame 116 may be mounted or otherwise connected to the housing 118 as a way of providing additional stability. At least a portion of the frame 116 may form a ladder structure, such as but not limited to, in an A-frame configuration where the back portion extends past the front portion along the top of the A-frame type structure, though any configuration may be utilized.

The frame 116 may comprise a second portion configured to support a net 122. The second portion of the frame 116 may comprise one or more arms 120, which may generally extend upward and/or splay outwardly. The net 122 may be attached to and extend between one or more of the arms 120 that rise above the housing 118. The frame 116 may comprise any number of members of any size, shape, and arrangement.

Some or all of the frame 116 may be configured for movement between an expanded position where at least a portion of the frame 116 extends above a rim of a basketball goal 130, and a collapsed position where at least some of the members of the frame 116 are located in close proximity to one another. When placed in the expanded position, the arms 120 may splay outwardly and cause the net 122 to form a funnel shape.

Alternatively, or additionally, some or all of the frame 116 may be adjustable in height. For example, one or more members of the frame 116 may be coaxially receivable over or into one or more other members of the frame 116. For example, without limitation, the arms 120 may be telescopically adjustable.

The height and width of the net 122 may be adjusted by moving the frame 116 between the collapsed and the expanded position. Such movement may include, but does not necessarily require, the telescopic adjustment of various members of the frame 116. When in the expanded position, the frame 116 and net 122 may form a funnel arrangement configured to direct basketballs captured by the net 122 towards a central exit point located adjacent to the housing 118. This central exit point may, in exemplary embodiments, feed basketballs that are funneled through the net into the housing 118 through the first aperture 126.

In exemplary embodiments, without limitation, the basketball launching machine 100 may be configured for placement below a basketball goal 130. The frame 116 may be configured to extend at least a portion of the net 122 above and around at least a portion of the basketball goal 130 when the frame 116 is in the expanded position. For example, the upper edge of the net 122 may extend above the rim of the basketball goal 130. Thus, when the frame 116 is in the expanded position, the position of the net 122 may force users to shoot their basketballs with particular trajectories in order to make a successful shot. By forcing a certain arc, the user may improve the likelihood that the basketball shot will be successfully made, such as in game situations when the net 122 is not there. Further, by collapsing the net 122 with the frame 116, the basketball launching machine 100 may be easily repositioned and/or stored for later use.

The user may position himself or herself at various locations along the basketball playing area to receive basketball passes. Once received, the user may shoot basketballs at the basketball goal 130. All or most of the shots, successfully made or otherwise, may be captured by the net 122 and returned to the housing 118 to again be passed by the basketball launching machine 100 to the same or different locations. The basketball launching machine 100 may be configured to store multiple basketballs in the housing 118, launching device 111, the net 122, and/or along one or more tracks, guides, or storage areas therebetween. In doing so, the basketball launching machine 100 may consistently and continuously pass basketballs to the user with limited to no reloading down time.

The basketball launching machine 100 may be provided with an interface 124. The interface 124 may be configured to, among other things, receive user input regarding desired pass receipt locations for the user to receive basketball passes from the launching device 111. This interface 124 may be located directly on the basketball launching machine 100. Alternatively, or additionally, the interface 124 may be located remote from the basketball passing machine 100, such as at a remote electronic device 138. More than one interface 124 may be provided to receive one or more types of user input. The user input received at the interface 124 may be used to program the basketball launching machine 100 to launch basketballs to the locations on the basketball playing area corresponding to pass receipt locations selected at the interface 124.

One or more cameras 132 may be mounted to the basketball launching machine 100. The cameras 132 may be configured to capture images or video of the user catching the basketballs and shooting them towards the basketball goal 130. The cameras 132 may be configured to pan, rotate, zoom, focus, or the like to the locations the basketballs were passed to. For example, without limitation, the cameras 132 may be mounted to the housing 118 such that the cameras 132 rotate with the housing 118 to keep the user in view. In other exemplary embodiments, the cameras 132 may be configured for movement independent of the housing 118. In exemplary embodiments, the cameras 132 are mounted to the housing 118, though the cameras 132 may be mounted at other location. In other exemplary embodiments, the camera 132 may comprise a sufficiently wide-angle lens that the camera 132 may capture images of the user at various locations without rotation of other movement of the camera 132. Alternatively, or additionally, some or all of the cameras 132 may be provided separate from the basketball launching machine 100. For example, some or all of the cameras 132 may be selectively connectable to the basketball goal, may be configured for placement around the basketball playing area, combinations thereof, or the like.

A single camera 132 or more than one camera 132 may be utilized. Where more than one camera is used, images from the various cameras 132 may be stitched together, displayed together, or displayed separately in a synchronized fashion. For example, without limitation, a first camera 132 may provide a front view of the user. A second camera 132 may provide a side view of the user. A third camera may provide a perspective view. As another example, a first camera 132 may provide a zoomed-in or enlarged view of the user and a second camera 132 may provide a wide-angle or zoomed-out view of the user. Any number of cameras 132 showing any number of views may be utilized.

One or more electronic displays 134 may be mounted to the basketball launching machine 100. The electronic display 134 may display information to a user. The electronic displays 134 may comprise any type of display technology, such as but not limited to, LCD, LED, OLED, projection, rear projection, cathode ray tube, plasma, some combination thereof, or the like. The information to be displayed may include, for example, images and/or video of a coach, shooting statistics (including but not limited to, overall percentage of made/missed shots, percentage of made/missed shots at various shooting locations), pass receipt location information, shooting location information, shooting session information, images and/or videos from the camera 132 (such as of the user), machine conditions (e.g., number of basketballs within the housing 118, normal operations, challenge mode, etc.), combinations thereof, and/or the like.

In exemplary embodiments, without limitation, one or more of the electronic displays 134 (hereinafter sometimes referred to as a "front display" 134) may be mounted to a housing 118 for the launcher 111. The front display 134 may be configured for movement with the launcher 111, by connection to the housing 118 or otherwise, so that the participant may maintain a desirable viewing angle while moving around the playing area, though such is not required. In this manner, glare may be reduced. In other exemplary embodiments, without limitation, the front display 134 may be stationary. For example, the front display 134 may not move with the launcher 111 in such embodiments. The front display 134 may be directly or indirectly attached to the housing 118, frame 116, and/or other component of the machine 100.

One or more audio devices 136 may be mounted to the basketball launching machine 100. The audio devices 136 may comprise microphones and/or speakers. The audio devices 136 may be configured to detect noises and/or transmit noises. In exemplary embodiments, the audio devices 136 may be configured to detect audio from the user and/or transmit audio from the coach. The audio devices 136 may be mounted to the housing 118, though any location may be utilized. This audio may be useful to a coach so that the coach may evaluate the shooting performance of the user. Likewise, the audio transmitted by the audio device 136 may include, for example, feedback from the coach instructing the user on how the user can improve his/her shooting ability. Such video and/or audio may be provided in substantially real time such that the user may interact with the player or coach in a more fluid, conversational type way, though such is not required.

The basketball launching machine 100 may be in electronic communication with one or more remote electronic devices 138. Each remote electronic device 138 may comprise a computer, smart phone, tablet, some combination thereof, or the like. The remote electronic devices 138 may be associated with the coach, the player, or other third parties. The remote electronic device 138 may be provided either alternatively or additionally to the interface 124, and may be configured to receive user input regarding desired locations to pass the basketballs. After the user input is received at the remote electronic device 138, the basketball launching machine 100 may begin launching basketballs to the various locations on the basketball playing area corresponding to the user input.

The basketball launching machine 100 may comprise one or more sensors 160. The sensors 160 may be configured to detect whether the basketballs have passed through a rim of the basketball goal 130, thereby representing a successfully made basketball shot. In exemplary embodiments, the sensor(s) 160 may be removably or permanently attached to a rim or other portion of the basketball goal 130. In other exemplary embodiments, the sensors 160 may be mounted to the frame 116, the housing 118, the net 122, combinations thereof, or the like.

The sensors 160 may comprise a light sensor or other photoelectric eye. In other exemplary embodiments, the sensors 160 comprise one or more shooting cameras 159 configured to capture images of the underside or other portion of the rim of the basketball goal 130 and utilize machine vision software to detect the presence of basketballs passing through the rim. For example, without limitation, the shooting camera 159 may be provided below the basketball goal 130 and may be configured to capture images of basketballs as they are shot towards the basketball goal 130. The shooting cameras 159 may constitute one of the cameras 132 which provide images to a coach or user, though such is not required. Stated another way, one of the cameras 132 may serve as the shooting camera 159, which may act as a sensor 160.

In yet other embodiments, the sensor 160 may comprise one or more accelerometers attached to one or more protrusions extending into the area below the rim of the basketball goal 130 to be contacted by basketballs passing through the rim. In yet other embodiments, the sensor 160 may comprise one or more flapper devices extending into the area below the rim of the basketball goal 130 to be contacted by basketballs passing through the rim. In yet other embodiments, the sensor 160 may comprise one or more microphones configured to detect the sound of basketballs passing through the rim of the basketball goal 130. Any kind or type of sensor 160, multiple sensors 160, or combinations of various type sensors 160, may be utilized.

The basketball launching machine 100 may comprise a controller 162. The controller 162 may be configured to receive data from the sensor(s) 160 indicating whether or not a shot has been successfully made. The controller 162 may be configured to receive data from the interface 124 and/or personal electronic device 138 indicating the pass receipt locations selected by the user to receive basketball passes at. For example, without limitation, if the sensor 160 transmits data to the controller 162 indicating that a shot has been successfully made within a predetermined time from passing of one of the basketballs from the launching device 111, the controller 162 may be configured to determine that the shot corresponding to the last basketball pass from the launching device 111 was successfully made. If no data is received from the sensor 160 within a period of time, the controller 162 may determine that the last basketball pass from the launching device 111 was not successfully made for that attempt.

The controller 162 may be configured to receive data from the cameras 132 and utilize machine vision software to determine if a basketball shot was attempted. Alternatively, or additionally, the controller 162 may be configured to receive data from the shooting cameras 159 and may utilize machine vision software to determine if a basketball shot was attempted and/or made.

The controller 162 may be in electronic communication with any number of components of the basketball launching machine 100. For example, the controller 162 may be in electronic communication with one or more of: the interface 124, the basketball launching device 111, the electronic display 134, the cameras 132, the shooting camera 159, the sensors 160, or some combination thereof. The controller 162 may, alternatively or additionally, be in electronic communication with the remote electronic device 138, though such is not required.

In exemplary embodiments, without limitation, the cameras 132, sensors 160, and/or audio device 136 may be in electronic connection with electronic storage devices, such as at the controller 162, which record such images, videos, and/or audio signals for later playback. Alternatively, or additionally, such data may be streamed to a remote electronic device 138, transmitted to a remote electronic storage device, combinations thereof, or the like. Such electronic communication may be facilitated by the controller 162 and/or network connectivity devices 144, such as but not limited to, routers, wi-fi devices, radio transmitters, cellular network devices, near field communication devices, combinations thereof, or the like as further provided herein.

Figure 2:
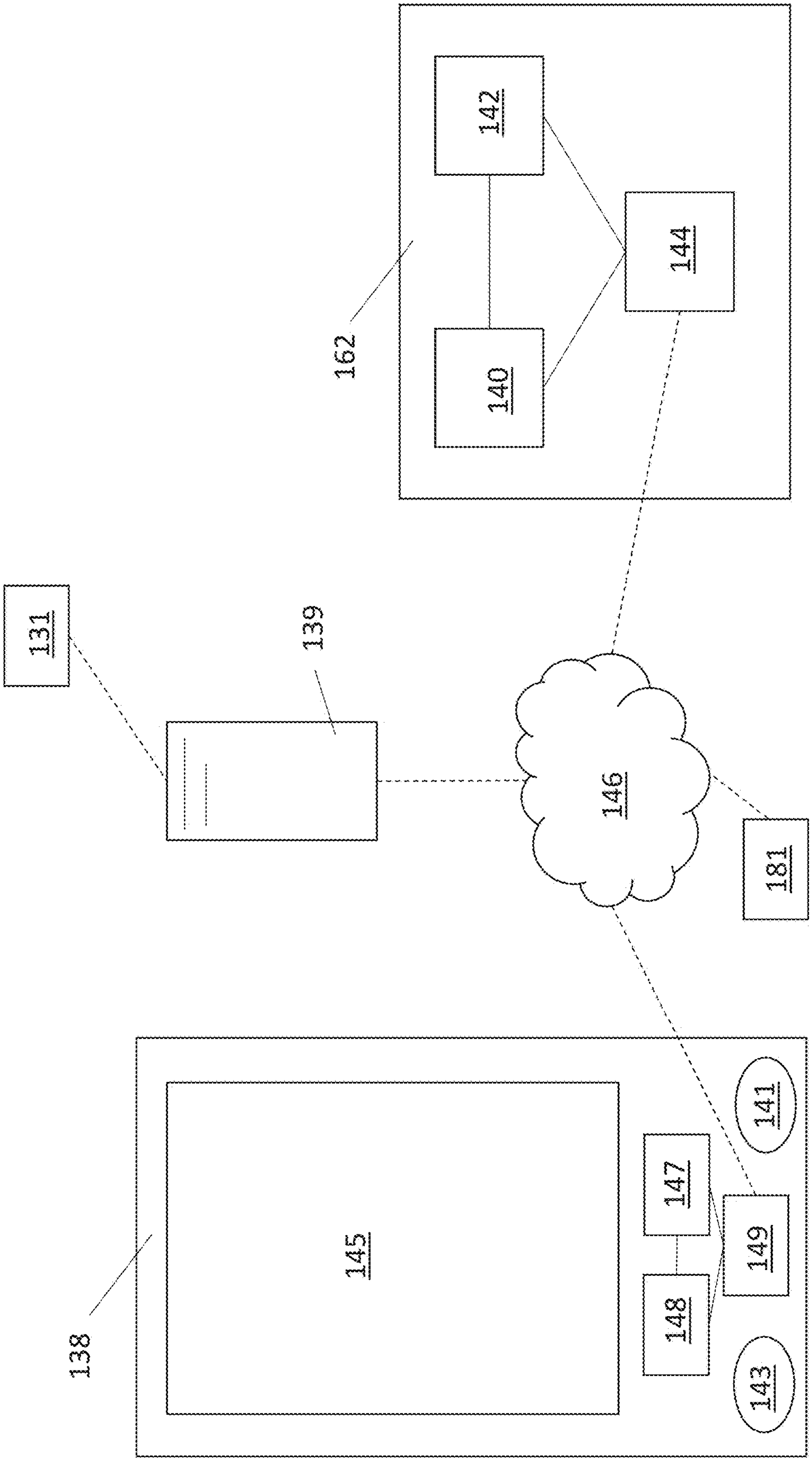
FIG. 2 is a simplified block diagram of a communication and/or control system for the system of FIG. 1A.

FIG. 2 illustrates a plan view of a communication and control system for the basketball passing machine 100. The controller 162 may comprise one or more electronic storage devices 140. The controller 162 may comprise one or more processors 142. The controller 162 may comprise one or more network connectivity devices 144. Such components may be housed together, or may be separately provided throughout the basketball passing machine 100.

The remote electronic device 138 may comprise one or more electronic storage devices 148. The remote electronic device 138 may comprise one or more processors 147. The remote electronic device 138 may comprise one or more network connectivity devices 149. The remote electronic device 138 may comprise one or more electronic displays 145. Those skilled in the art will appreciate, however, that other embodiments of the controller 162 and the remote electronic device 138 may include one or more of the respective aforementioned components (ref. nos. 140, 142, 144, 147, 148, 149), as well as additional components that may further increase the functionalities of the controller 168 and the remote electronic device 138 without resulting in a departure from the scope of the present disclosure. For example, in exemplary embodiments, the remote electronic device 138 may further include one or more cameras 141 and/or audio devices 143. The audio devices 143 may include, for example, one or more microphones and/or speakers to enable the transmission and/or detection of audio.

The controller 162 may be in electronic communication with a remote electronic device 138 through respective network connectivity devices 144, 149. More specifically, the network connectivity devices 144, 149 may establish a connection through a network 146 (e.g., internet, intranet, the world wide web, a wireless network, a wired network, a cellular network, some combination thereof, or the like). Other methods of connecting the controller 162 and the remote electronic device 138, such as though a wired connection or by some other means that does not make use of network connectivity devices 144, 149, are also contemplated and may be employed without departing from the scope of the present disclosure.

The remote electronic device 138 and/or the basketball launching machine 100 may also be in electronic communication with one or more remote databases 139. The remote databases 139 may be configured to store, retrieve, and transmit data such as but not limited to, video or images captured by the cameras 132, the shooting cameras 159, the sensor(s) 160, the controller 162, the remote electronic device 138, the basketball launching machine 100, various components thereof, some combination thereof, or the like. The remote database 139, the cameras 132, the shooting cameras 159, the sensor(s) 160, the controller 162, the remote electronic device 138, the basketball launching machine 100, various components thereof, some combination thereof, or the like may be configured to time stamp or otherwise code such images and/or data. In this way, data images or other data at the remote database 139, or received from the cameras 132, the shooting cameras 159, the sensor(s) 160, the controller 162, the remote electronic device 138, the basketball launching machine 100, various components thereof, some combination thereof, or the like may be synchronized with one another.

Additional data from peripheral devices 131, such as but not limited to heart rate monitors, timing devices, respiration monitors, pedometers, oxygen saturation monitors, some combination thereof, or the like, may be received at the remote database 139, the controller 162, the remote electronic device 138, the basketball launching machine 100, various components thereof, some combination thereof, or the like. Such additional data may be time stamped or otherwise coded. In this way, data from such peripheral devices 131 may be synchronized with the images or other data at the remote database 139, or received from the cameras 132, the shooting cameras 159, the sensor(s) 160, the controller 162, the remote electronic device 138, the basketball launching machine 100, various components thereof, some combination thereof, or the like. The peripheral devices 131 may be in electronic communication with said basketball passing machine 100 by way of said network connectivity devices 144.

The controller 162 may be located at the basketball passing machine 100. In other exemplary embodiments, the controller 162 is located at the remote electronic device 138, and/or another remote electronic device. The controller 162, or other components, may be in electronic communication with one or more remote servers 181 for storing and/or processing data. Such connection may be by way of said network 146.

Figure 3:
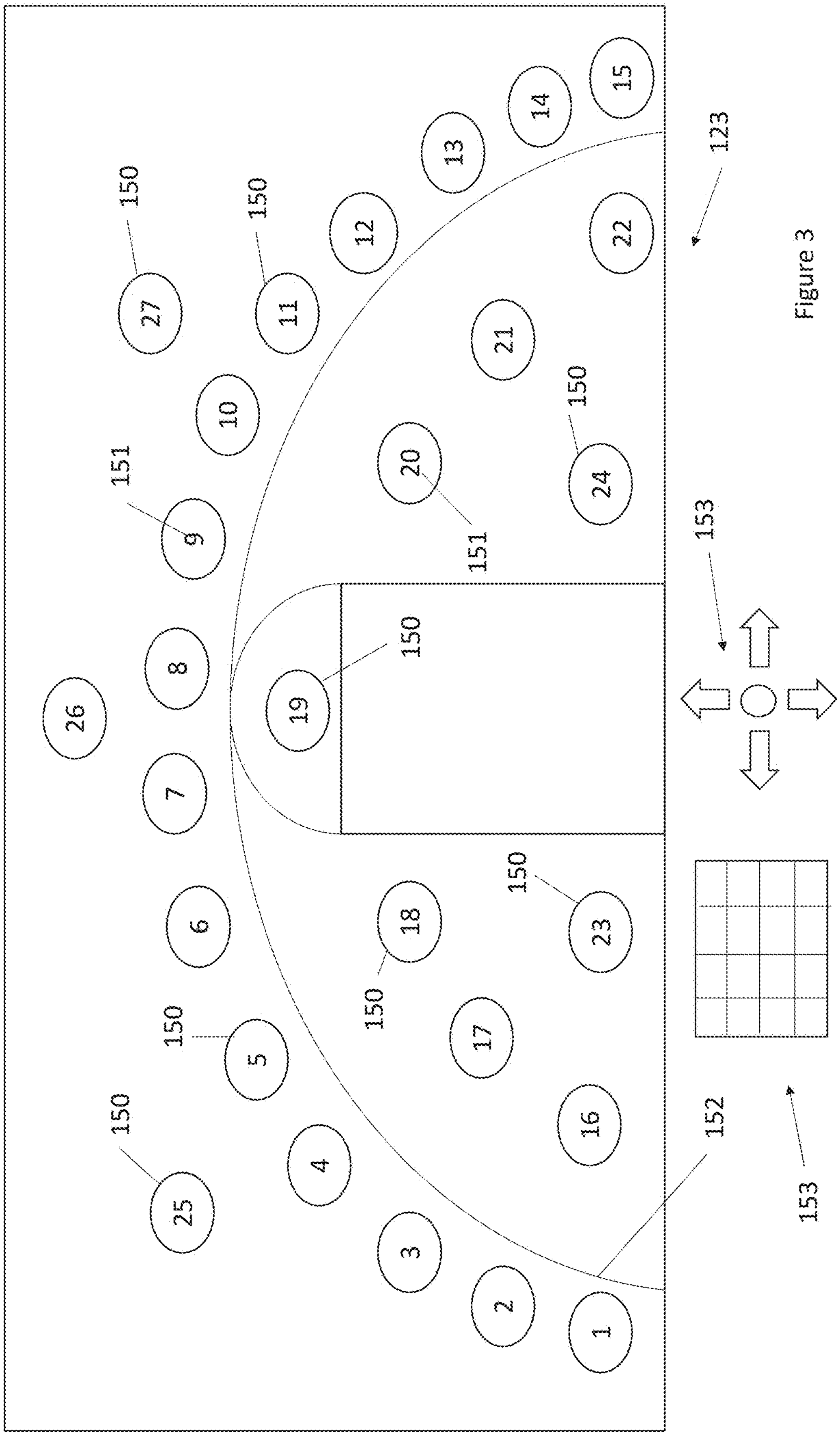
FIG. 3 is a front view of an exemplary interface for the system of FIG. 1A.

FIG. 3 illustrates an exemplary interface display 123 that may be utilized by a user to enter user input. The interface display 123 may be provided at the interface 124, the electronic display 134, the remote electronic device 138, some combination thereof, or the like. Where the interface display 123 is provided at more than one location, the interface display 123 may be updated at all locations, such as but not limited to, the basketball launching machine 100 and the remote electronic device 138, at the same, or similar times. Such updating may be performed in substantially real time or at any interval. User input may be received at the interface display 123. In exemplary embodiments, without limitation, such user input is received at the user interface 124 of the basketball launching machine 100, however, such user input may alternatively or additionally be received at the remote electronic device 138. For example, a user may utilize the interface display 123 to select various locations where the user desires to receive one or more basketball passes. Once selected, the controller 162 may be configured to receive the user input and direct the basketball launching machine 100 to pass the basketballs to the locations on the basketball playing area corresponding to the pass receipt locations selected by the user. In exemplary embodiments, the controller 162 may be configured to direct the basketball launching machine 100 to pass the basketballs to the locations on the basketball playing area corresponding to the pass receipt locations selected by the user, and in the order in which the user selected said pass receipt locations. In other exemplary embodiments, selections may automatically be re-ordered numerically, from right to left, from left to right, closest to furthest, furthest to closest, randomized, some combination thereof, or the like.

In one or more examples, the interface display 123 may be provided in a read-only mode such that user input from one or more users (e.g., a player or a coach) may not be accepted. The read-only mode may effectively prevent said users from interfering with, for example, an ongoing practice session. However, it is generally contemplated that those prohibited users may still be able to view the interface display 123 to monitor the practice session. For example, without limitation, a read-only interface display 123 may be provided at the remote electronic device 138 and a read-write interface display 123 may be provided at the interface 124. In this way, the user may make shooting selections while the coach may not. However, read-write interface displays 123 may be provided at both the remote electronic device 138 and the interface 124, and/or at other locations.

Upon entering user input, the interface display 123 may be updated to reflect the choices made by the user. Updates may be applied simultaneously (or substantially simultaneously) on all of the devices displaying the interface display 123, such as in real-time or substantially real-time. However, it is also contemplated that updates that are applied at different times, on less than all of the devices, and/or at regular intervals (i.e., not in real-time), would not depart from the scope of the present disclosure.

The interface 123 may comprise one or more pass receipt locations 150 where the basketball launching machine 100 may launch basketballs. These pass receipt locations 150 may correspond to, for example, actual locations on a basketball playing area where a basketball player may attempt a shot. By selecting one or more of these pass receipt locations 150, the controller 162 may be configured to receive this user input and program the basketball launching machine 100 to launch basketballs with sufficient force such that the basketballs will travel substantially the distance required to reach the actual locations on the basketball playing area corresponding to the selected pass receipt locations 150. The pass receipt locations 150 may be visible at the interface display 123 prior to and/or after selection. For example, all possible pass receipt locations 150 may be visible prior to selection and the selected ones of the pass receipt locations 150 may be highlighted, illuminated, changed, or otherwise modified upon selection. In other exemplary embodiments, the interface display 123 may be devoid of pass receipt locations 150 until such pass receipt locations 150 are selected by the user at which time they become visible.

In exemplary embodiments, the pass receipt locations 150 may be located on or around a visual depiction 152 of a basketball playing area rendered or otherwise provided at the interface 124 and/or interface display 123. The visual depiction 152 may be a complete or partial rendering of an exemplary basketball playing area, and may include, for example without limitation, a three-point arc, a key, a baseline, side lines, a half court line, a center circle, a foul shooting line, some combination thereof, and/or the like. The visual depiction 152 of FIG. 3 is merely exemplary and is not intended to be limiting. The visual depiction 152 may comprise one or more components of a regulation basketball half-court (e.g., NBA/NCAA). Those skilled in the art will appreciate, however, that any style of basketball playing area could be partially and/or completely rendered without departing from the scope of the present disclosure.

The number and arrangement of pass receipt locations 150 on the visual depiction 152 may be varied as desired without departing from the scope of the present disclosure. For example, the pass receipt locations 150 may be provided in a spaced angular pattern, such as along a rendering of a three-point arc. The pass receipt locations 150, in this example, may be positioned on, inside, and/or outside the three-point arc. In another example, the pass receipt locations 150 may be located within or around a visual depiction 152 of the key, the foul line, and/or any other part of the visual depiction 152. In other examples, the pass receipt locations 150 may be spaced randomly or in a pattern. Any number of pass receipt locations 150 may be located anywhere on the visual depiction 152.

The interface 124 may comprise a touch screen, such as but not limited to a resistive or capacitive type touch screen. The interface 124 may comprise a non-touch sensitive electronic display, such as but not limited to an LCD, LED, OLED, or the like. Alternatively, or additionally, the interface 124 may comprise a panel. The pass receipt locations 150 may comprise indicia such as but not limited to an outline, shape, arrow, dot, mark, number, character, circle, or other demarcation. The indicia may provide reference points for the user. Alternatively, or additionally, the pass receipt locations 150 may be selectable such as but not limited to depressible, actuatable, or otherwise selectable buttons. The pass receipt locations 150 may comprise electro-mechanical buttons. The pass receipt locations 150 may comprise electronic icons or indicia. The pass receipt locations 150 may be directly selectable by physical touch. The pass receipt locations 150 may be individually selectable using direct physical touch. For example, without limitation, the pass receipt locations 150 may comprise depressible buttons on the interface 124 and/or on a remote electronic device 138. A user may depress one or more of these depressible buttons to select one or more pass receipt locations 150. In another example, the pass receipt locations 150 may comprise touch areas at a touchscreen display. The pass receipt locations 150 may be visible prior to selection, or only after being selected. The pass receipt locations 150 may be configured for selection by direct or indirect actuation, such as by way of a finger or stylus, for example without limitation.

Each of the pass receipt locations 150 may comprise a marker 151. The marker 151 may comprise one or more characters such as 1, 2, 3, etc., A, B, C, etc., I, II, III, etc. or the like. The markers 151 may serve as reference points for a user or coach.

In exemplary embodiments, the pass receipt locations 150 may be indirectly selectable by way of an indirect selection device 153. The indirect selection device 153 may be located on or in close proximity to the interface display 123. The indirect selection device 153 may be, for example, a mouse, cursors, arrow and select keys, alphanumeric keys, and/or the like. The indirect selection device 153 may comprise electro-mechanical buttons, icons on an electronic display, touch pads, joysticks, combinations thereof, or the like.

Each of the pass receipt locations 150 may be configured to be individually selected, actuated, highlighted, touched, depressed, or otherwise interacted with in a direct or indirect manner. Alternatively, or in addition, the basketball launching machine 100 may comprise one or more pre-programmed collections of pass receipt locations 150 that may be selected to cause the basketball launching machine 100 to initiate a pre-programmed drill wherein one or more pass receipt locations 150 are collectively selected in a pre-programmed manner. For example, without limitation, the user or coach may select a free throw drill where the pass receipt locations 150 at the free throw line is automatically programmed. As another example, without limitation, the user or coach may select a three-point drill where a number of pass receipt locations 150 about the three-point arc are automatically programmed.

Each of the pass receipt locations 150 may be configured to indicate whether or not the respective one of the pass receipt locations 150 has been selected. For example, without limitation, the pass receipt locations 150 may be configured to appear, disappear, be illuminated, be darkened, change color, remove or add the marker 151, and/or the like upon selection or deselection. This may differentiate selected pass receipt locations 150 from non-selected pass receipt locations 150. Alternatively, or additionally, the pass receipt locations 150 may each comprise an illumination device (e.g., a lightbulb within a depressible button) to accomplish the same. In other exemplary embodiments, the interface 124 and/or the remote electronic device 138 may comprise a touchscreen, and the appearance of the pass receipt locations 150 at the interface display 123 may be altered when directly or indirectly selected. Such alterations may include, for example, appearance, disappearance, changes in shape, size, color, illumination, darken, some combination thereof, and/or the like. In exemplary embodiments, the interface display 123 may comprise the rendering 152 and the user may select various locations 150 and the indicia and/or markers 151 may appear at the approximate area of selection following the user input (direct or indirect). In other exemplary embodiments, the pass receipt locations 150 may not be visible until an area on the interface 124 and/or the remote electronic device 138 is selected or otherwise actuated and then the pass receipt locations 150 and/or the markers 151 may be made visible at substantially the pass receipt location 150 selected.

Upon user selection of one or more of the pass receipt locations 150, data representing the selected locations 150 may be received by the controller 162 which may command the launching device 111 to move and/or to launch the basketballs with sufficient force and/or in an appropriate direction such that the basketballs will travel substantially the distance required to reflect the actual location on the basketball playing area corresponding to location of the selected locations 150 on the rendering 152.

Figure 4:
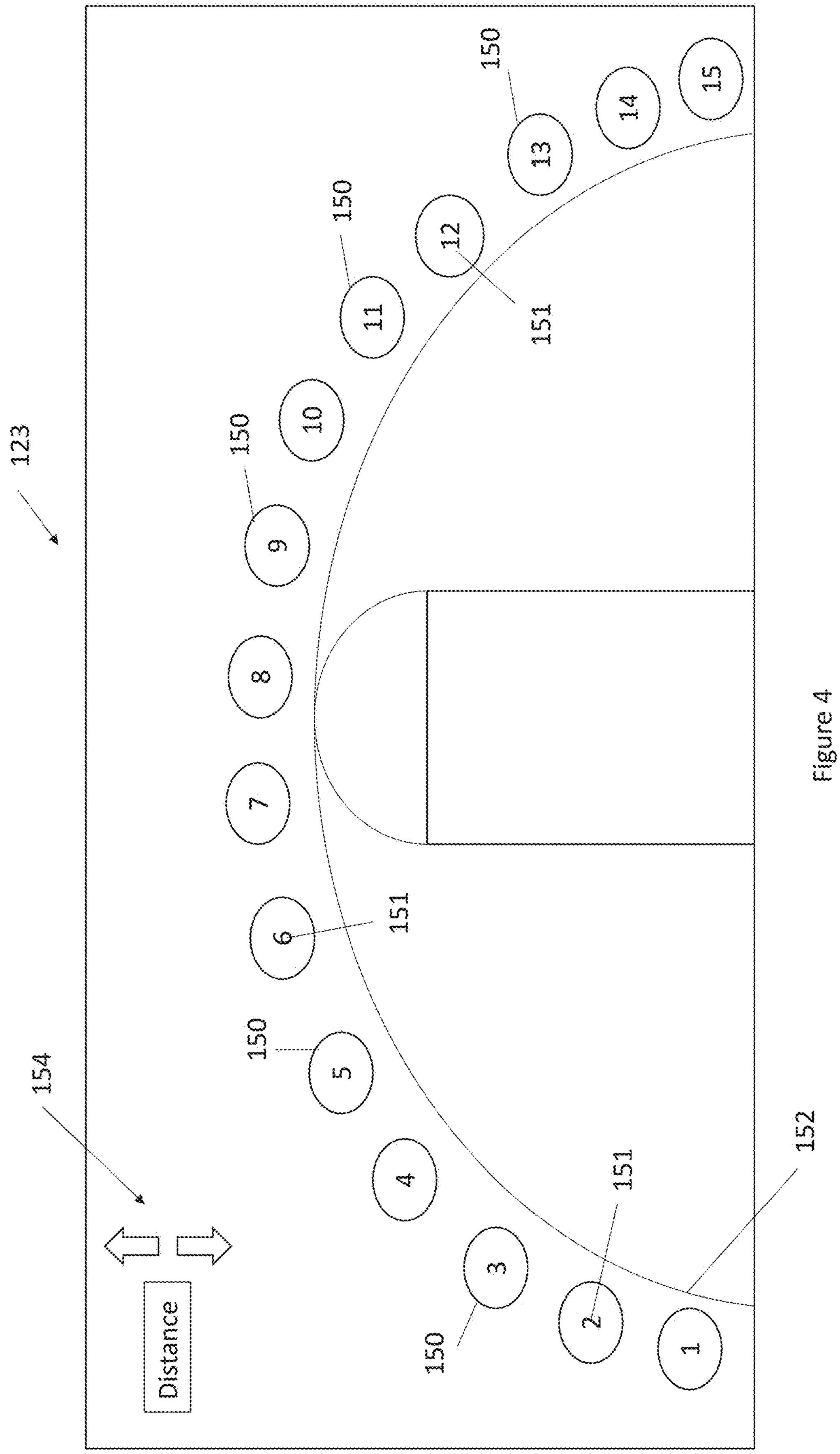
FIG. 4 is a front view of another exemplary embodiment of the interface for the system of FIG. 1A.

FIG. 4 illustrates another exemplary embodiment of the interface display 123. A distance selection tool 154 may be provided on or in close proximity with the interface display 123. The distance selection tool 154 may comprise arrow keys, a number pad, some combination thereof, and/or the like. For example, without limitation, the user may select an up or a down arrow to increase or decrease the distance the basketballs are to be passed, respectively. Upon such a selection, the controller 162 may be configured to command the launcher 111 to launch the basketballs with increased or decreased force to reflect the user selection. The distance the basketballs are thrown may be displayed numerically and may be adjusted for all shots in a shooting routine or for each individual shot within a shooting routine. In other exemplary embodiments, the interface 123 may be configured to adjust the pass receipt locations 150 displayed as the distance selection tool 154 is utilized to reflect the approximate location on the actual basketball playing area the user should stand to receive the basketball pass. As a further example, without limitation, the user may use a keypad to enter a numerical distance amount, such as but not limited to, an approximate number of feet the basketball is to be launched. The distance selection tool 154 may comprise electro-mechanical buttons or icons on an electronic display.

Figure 5:
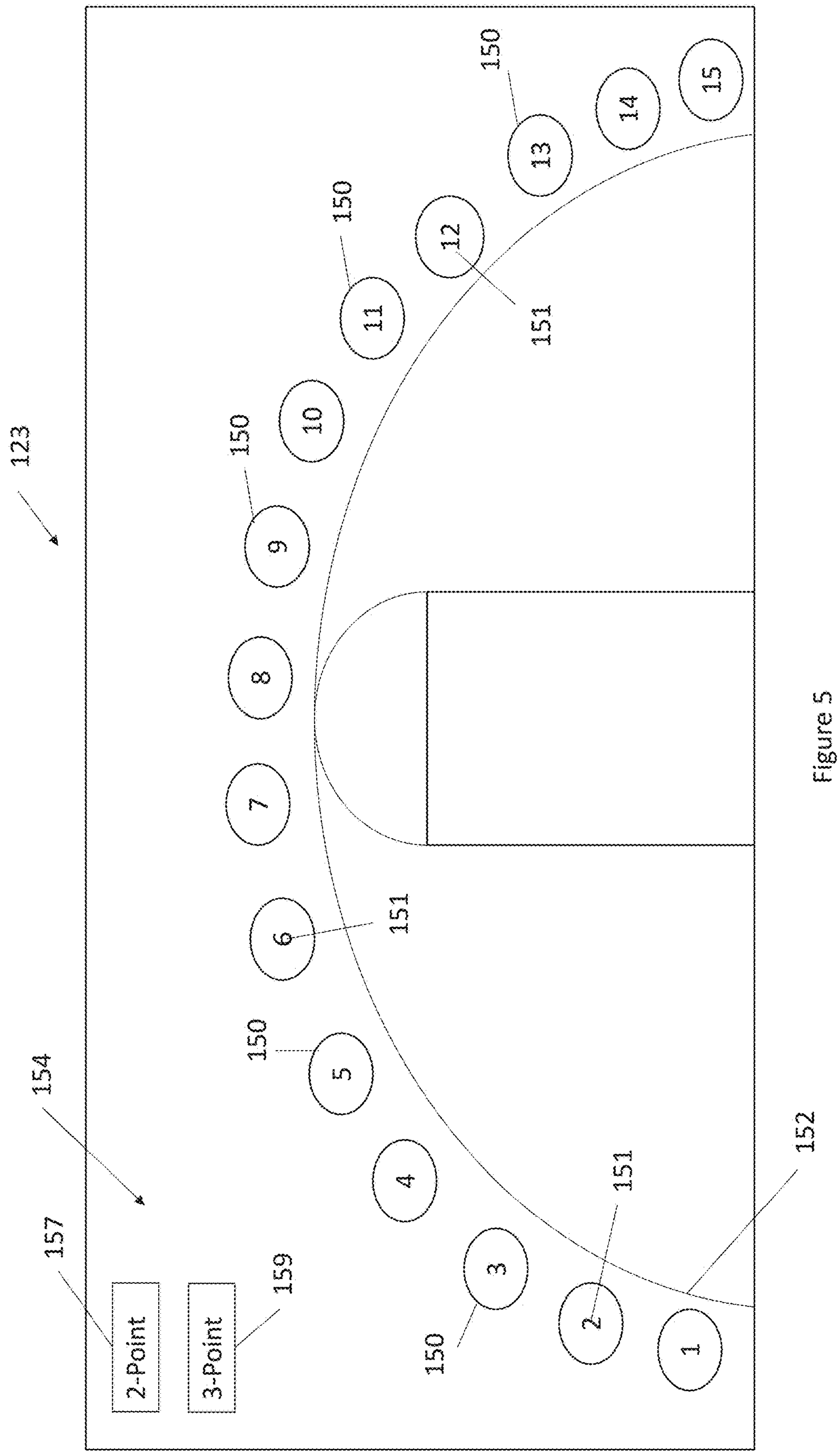
FIG. 5 is a front view of another exemplary embodiment of the interface for the system of FIG. 1A.

FIG. 5 illustrates another exemplary embodiment of the interface display 123. The distance selection tool 154 may comprise a 2-point shooting distance option 157 and/or a 3-point shooting distance option 159. The 2-point and 3-point distance devices 157, 159 may comprise buttons, indicia, some combination thereof, and/or the like, and may be capable of being selected directly or indirectly. Selection of the 2-point and/or 3-point distance devices 157, 159 may cause the basketball launching machine 100 to automatically adjust the distance the basketballs are thrown appropriately as described herein. For example, upon such a selection, the controller 162 may be configured to command the launcher 111 to launch the basketballs with increased or decreased force to reflect the user selection. The 2-point and/or 3-point distance devices 157, 159 may be selected for each location selected. The basketball launching machine 100 may be preprogrammed with a default distance if no distance is selected. In exemplary embodiments, the default distance may be the last distance selected by the user. After the distance has been selected, the interface display 123 may be updated to indicate that a selection has been made. The 2-point shooting distance option 157 and/or a 3-point shooting distance option 159 may comprise electro-mechanical buttons or icons on an electronic display.

Figure 6:
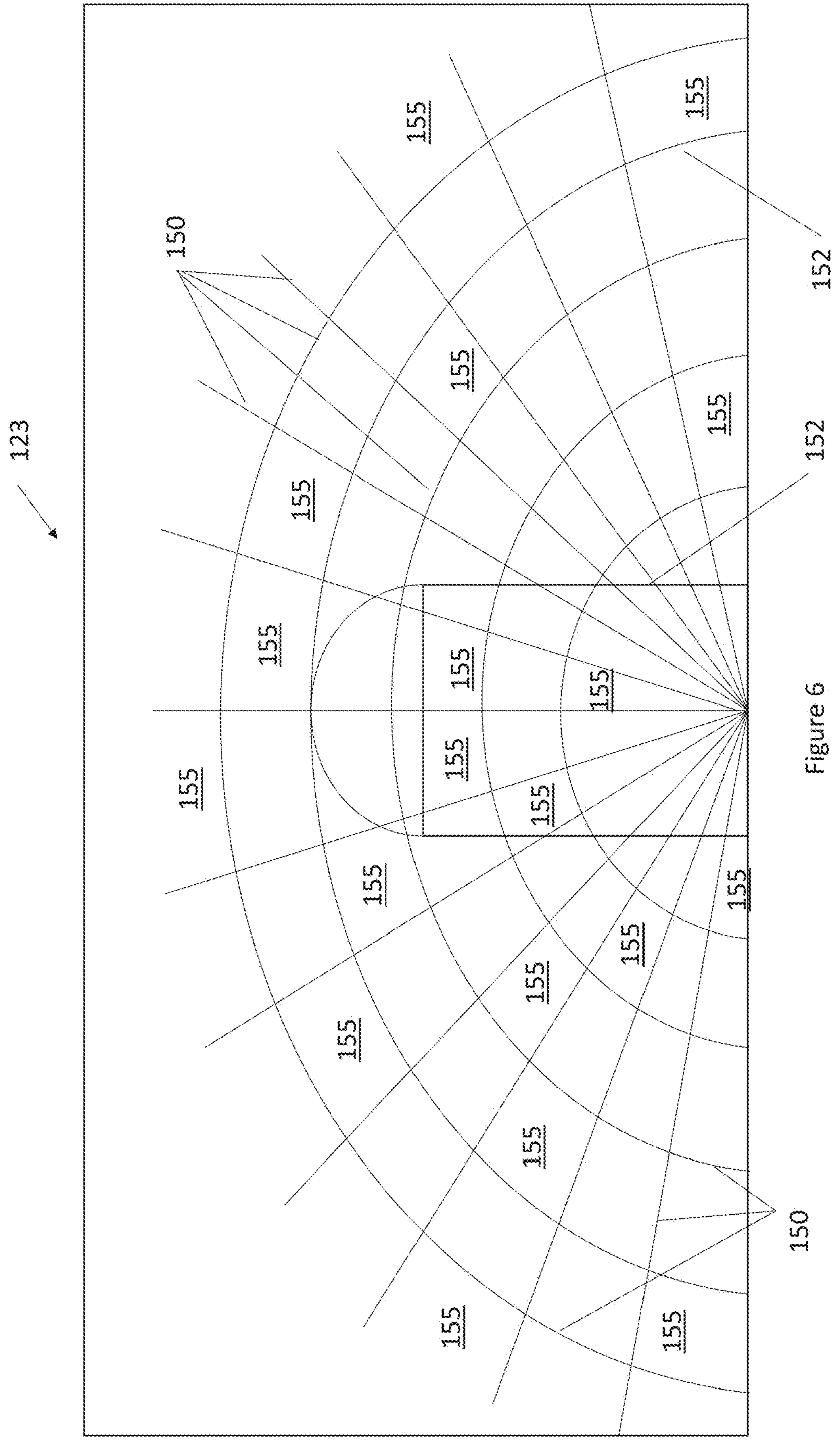
FIG. 6 is a front view of another exemplary embodiment of the interface for the system of FIG. 1A.

FIG. 6 illustrates another exemplary embodiment of the interface display 123. The pass receipt locations 150 may define one or more zones 155 which extend over some or all of the interface display 123. The zones 155 may comprise areas defined by the pass receipt locations 150, and may be directly or indirectly selected by the user. In operation, the zones 155 may permit the user to simultaneously select both the location and distance of the basketball pass. Selection of one or more zones 155 may cause the basketball launching machine 100 to automatically adjust the location and distance the basketballs are thrown. In one or more exemplary embodiments, the zones 155 may also comprise buttons, indicia 151, markers, some combination thereof, and/or the like to help the user differentiate one zone from another, and to select zones 155 if desired. The zones 155 may comprise electro-mechanical buttons, physical demarcations, or icons on an electronic display. The zones 155 may be defined by visible rendering elements, such as lines, of the visual depiction 150. In other exemplary embodiments, the visible rendering elements of the visual depiction 150 are not required such that the interface display 123 appears blank except for the rendered elements of the basketball playing area such that the zones 155 comprise electronically defined selection areas, such as at a touch screen.

Figure 7:
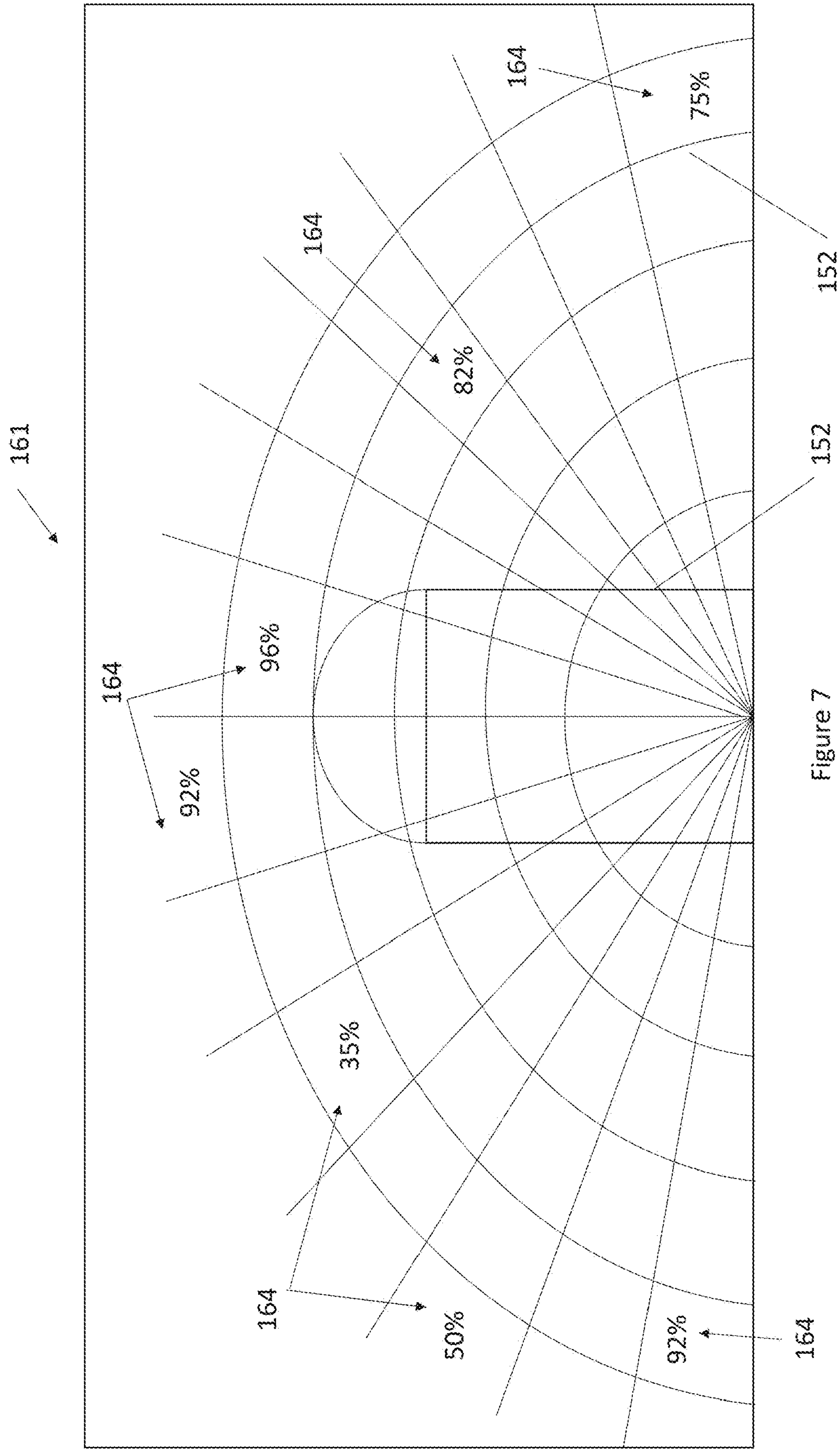
FIG. 7 is a front view of an exemplary visualization of a shooting statistics visualization for the system of FIG. 1A.

FIG. 7 illustrates an exemplary embodiment of a shooting statistics visualization 161. The interface display 123 and the shooting statistics visualization 161 may be displayed simultaneously, alongside one another, as a picture-in-picture, on a separate display, some combination thereof, and/or the like. The shooting statistics visualization 161 may comprise one or more shooting statistics 164 such as, for example, the number and/or percentage of shots made, missed, attempted, some combination thereof, or the like. In exemplary embodiments, the shooting statistics 164 may be displayed at the locations on the rendering 152 corresponding to the pass receipt locations 150 selected by the user. In other exemplary embodiments, the shooting statistics 164 may be displayed at the locations on the rendering 152 corresponding to the locations a player actually took a shot from, such as detected by the cameras 132 or provided as part of a training drill.

While FIG. 7 illustrates the shooting statistics 164 with regards to the interface display 123 of FIG. 6, the shooting statistics visualization 161 may be adapted to reflect any embodiment of the interface display 123 (such as but not limited to those shown and described with respect to FIGS. 3-5 and/or 11-19) or other arrangements.

The shooting statistics visualization 161 may be displayed on the same devices that the interface display 123 may be displayed on, such as, for example, the interface 124, the electronic display 134 associated with the basketball launching machine 100, the electronic display 145 associated with the remote electronic device 138, some combination thereof, or the like. Updating the shooting statistics visualization 161 may likewise be similar or the same to updating the interface display 123.

In exemplary embodiments, without limitation, the interface display 123 and/or the shooting statistics visualization 161 may be displayed along with (e.g., before, after, during, side-by-side, picture in picture, some combination thereof or the like) images and/or videos from the cameras 123, such as footage of the user taking basketball shots. This may be useful, for example, for a coach who is monitoring the user's performance because it would enable the coach to provide feedback, such as regarding the user's shooting form.

Figure 8:
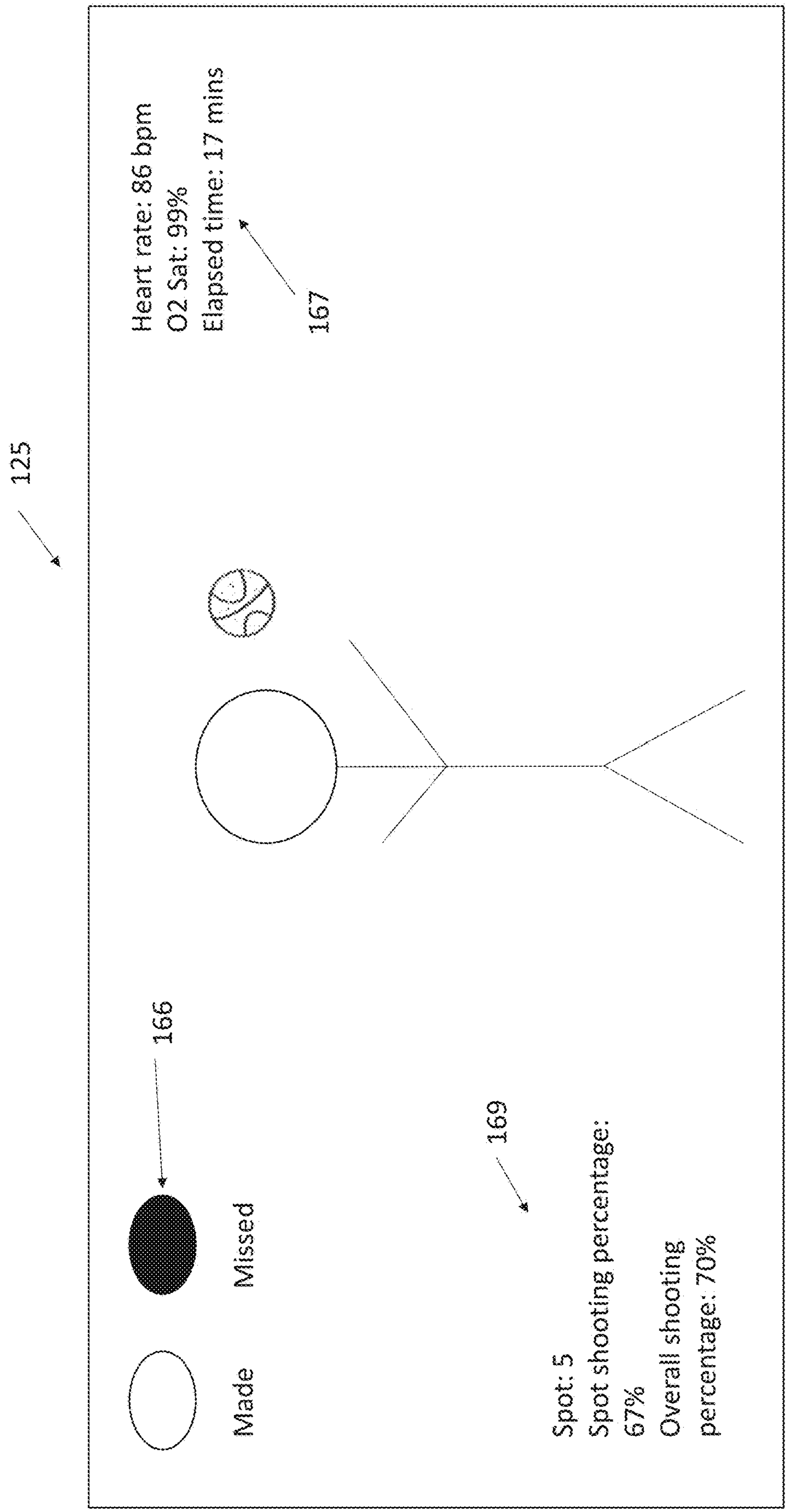
FIG. 8 is a front view of an exemplary virtual coaching interface for the system of FIG. 1A.
Figure 8B:
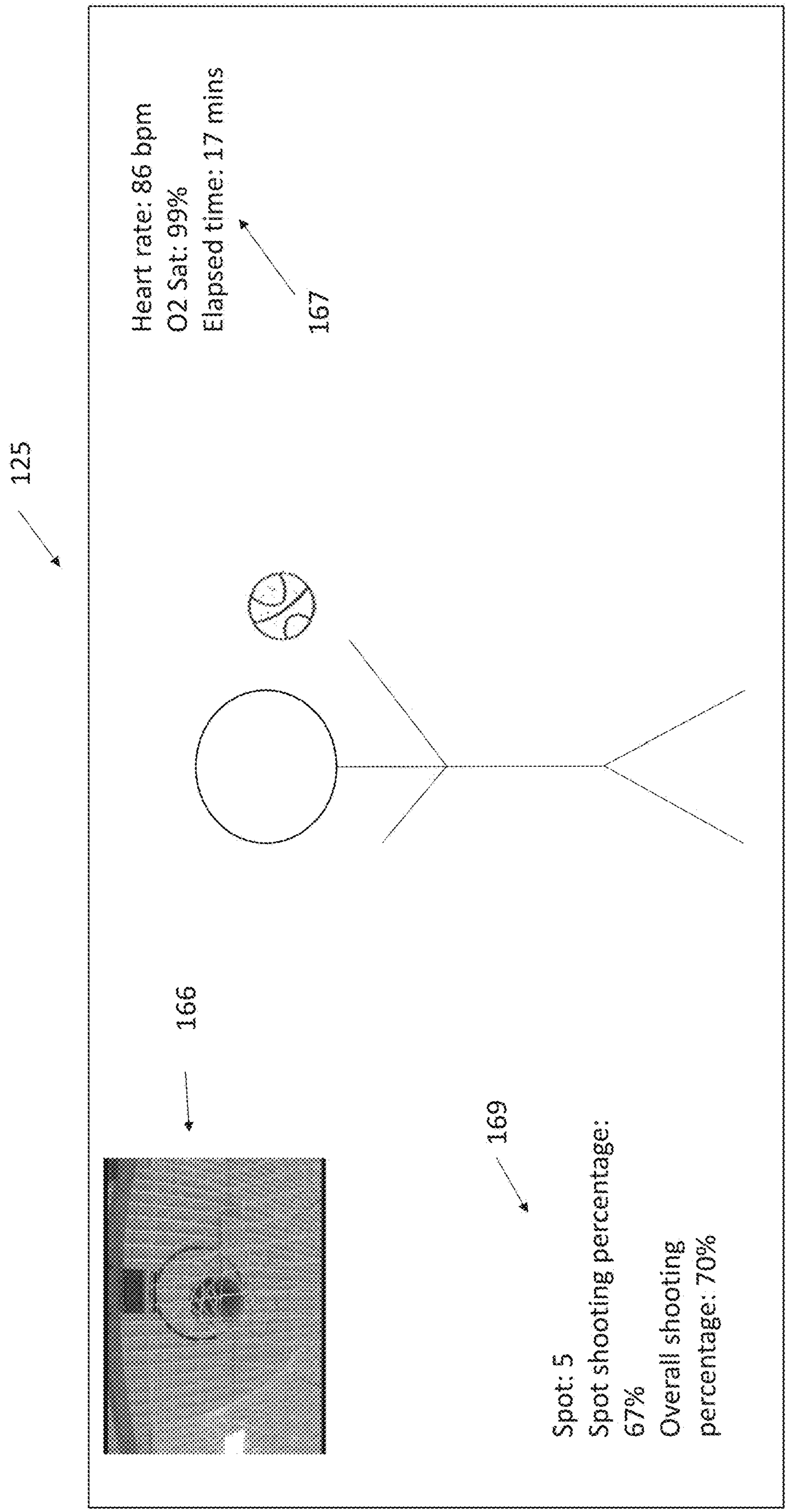
FIG. 8B is a front view of another exemplary virtual coaching interface for the system of FIG. 1A.

FIG. 8 and FIG. 8B illustrate exemplary virtual coaching interface displays 125 that may be displayed on one or more of the electronic displays 145 associated with the remote electronic device 138 and/or the electronic display 134 associated with the basketball passing machine 100. The visual coaching interface 125 may be displayed simultaneously, alongside, as a picture-in-picture, on a separate electronic display 145, some combination thereof, and/or the like, along with the interface display 123 and/or the shooting statistics visualization 161. The virtual coaching interface display 125 may include images and/or video received from the cameras 132, such as but not limited to, of the user taking basketball shots. In exemplary embodiments, such images and/or video may be received and displayed in substantially real-time, such as by way of streaming. In other exemplary embodiments, the images or video received from the cameras 132 may be stored and played back at the virtual coaching interface display 125 at a later time.

The virtual coaching interface display 125 may include a shooting result indicator 166. The shooting results indicator 166 may be electronically superimposed on images from the cameras 132, or may be provided as a separate portion of the display. The shooting results indicator 166 may be configured to indicate whether a particular shooting attempt resulted in a made shot or a missed shot. For example, without limitation, the words "made", "missed", some combination thereof, or the like, may be displayed at the virtual coaching interface display 125. Such shooting results indicator 166 may be updated corresponding with shots made or missed as detected by the sensors 160, the shooting camera 159, and/or determined by the controller 162. Further, the shooting results indicator 166 may be updated to correspond with the images or videos being shown of the user from the cameras 132. For example, without limitation, the shooting results indicator 166 may be updated in substantially real time along with the images or video from the camera 132. As another example, without limitation, the images or video from the camera 132 may be stored and the shooting results indicator 166 may be updated to correspond with the footage currently being displayed on the virtual coaching interface display 125. In exemplary embodiments, the shots made or missed as determined by the sensor 160 and/or the controller 162 may be time stamped or otherwise coded along with images or video from the camera 132 such that the two may be correlated when displayed at the virtual coaching interface display 125.

In one or more embodiments, indicia (e.g., a circle) may be provided above a made or missed label to indicate the same, and may be illuminated, darkened, colorized, decolorized, or otherwise changed as appropriate to indicate a made or missed shot resulting from the shooting attempt (e.g., green may correspond with made, and red with missed). Alternatively, or additionally, audio indication may be provided such as an audio recording stating a shot was made or missed, or the like. In this way, the player, the coach, or other third party may be able to review and provide feedback on shooting form while also understanding whether the form resulted in a made or missed shots. This may also be useful where a user is viewing a recording of their own shooting performance because upon review, the user may begin to notice that particular aspects of their form affected their ability to successfully make a shot. Similarly, this may be particularly helpful for coaches who begin to notice that particular aspects of the user's form which affect their ability to successfully make a shot. Audio recordings, visual feedback (such as but not limited to video or images, marked up video or images, etc.) from the coach may be recorded for later playback to the user. The shooting result indicator 166 shown and described is merely exemplary and is not intended to be limiting. Any type of shooting result indicator 166 may be employed without departing from the scope of the present disclosure. For example, without limitation, the shooting results indicator 166 may be icons, lights, some combination thereof, or the like.

In other exemplary embodiments, the virtual coaching interface display 125 may be configured to display images from the shooting camera 159. In this way, the coach or the user may determine that the shot was made or missed. Such images may be superimposed or displayed separately, such as at a dedicated portion of the virtual coaching interface display 125. For example, without limitation, the virtual coaching interface display 125 may show the user's shot and then simultaneously, before, after, showing the corresponding images from the shooting camera 159. Time stamping or other coding may be utilized to coordinate the displayed images.

Alternatively, or additionally, data 167 from one or more peripheral devices 131 may also be displayed at the virtual coaching interface display 125. The additional data 167 may include, for example, user heart rate, perspiration, oxygen saturation, respiration rate, workout time, some combination thereof, and/or the like, and may be displayed in any suitable form (e.g., indicia, markings, etc.). The data 167 may be superimposed or display separately.

Alternatively, or additionally, shooting data 169 may be displayed at the virtual coaching interface display 125. The shooting data 169 may be updated to reflect data received at the controller 162, sensors 160, cameras 132, shooting camera 159, received or displayed at the interface 124, the interface display 123, and/or the statistics visualization 161, combinations thereof, or the like. The shooting data 169 may comprise pass receipt locations 150 selected by the user, the shooting statistics 164, some combination thereof, and/or the like. The shooting data 169 may be provided in any form and may comprise a rendering of the basketball playing area to substantially match the interface display 123 and/or the statistics visualization 161, though such is not required. The shooting data 169 may be superimposed or display separately.

Figure 9:
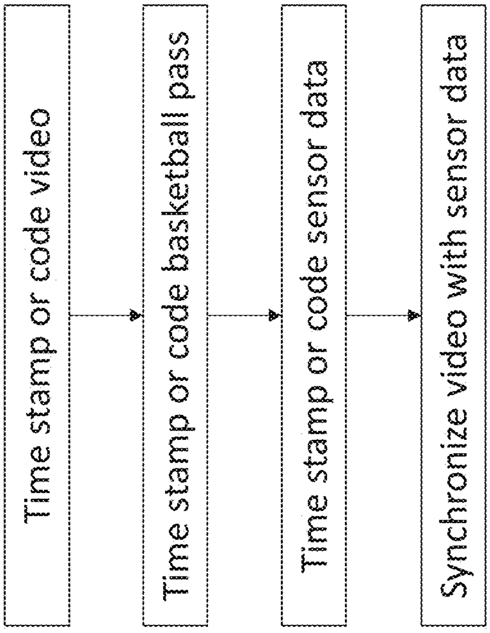
FIG. 9 is a flow chart with exemplary logic for creating performance data for the system of FIG. 1A.

FIG. 9 is a flow chart with exemplary logic for creating performance data generated by the basketball passing machine 100. In exemplary embodiments, video from the camera(s) 132 may be time stamped or otherwise coded. The timing of basketball passes from launching device 111 may be time stamped or otherwise coded. Data indicating made or missed shots from the sensor(s) 160, such as but not limited to the shooting camera 159, may be time stamped or otherwise coded. The time stamp or code may be set by a clock or other device. The same or similar time stamp or coding technique may be utilized for the camera(s) 132, the launching device 111, and/or the senor(s) 160, though such is not required. The time stamp or coding may be performed at the controller 162, though such is not required. In exemplary embodiments, the controller 162 may comprise a clock or other timekeeping device for performing the time stamp.

Performance data may be generated for a user's practice session by synchronizing data from the interface 124, controller 162, the launching device 111, and/or other components regarding the location of a basketball pass, data from the camera(s) 132 and/or other components showing the user's shooting attempt, and data from the sensor(s) 160 and/or other components indicating whether the shooting attempt resulted in a made shot or a missed shot. Such performance data may be provided as shown and discussed herein, particularly with respect to at least FIGS. 6-8, for example, without limitation. Such performance data may also include data from peripheral device 131 in exemplary embodiments.

The performance data may comprise images of the user during the shooting session with information displayed simultaneously, before, or after regarding pass receipt locations, shooting locations, shots made, shots missed, shots attempted, shooting percentage, some combination thereof, or the like. Alternatively, or additionally, the performance data may comprise a highlight reel of only made shots, only missed shots, shooting attempts from one or more particular locations, some combination thereof, or the like. The performance data may be generated by the controller 162, the electronic device 138, a remote server 181, combinations thereof, or the like.

Figure 10:
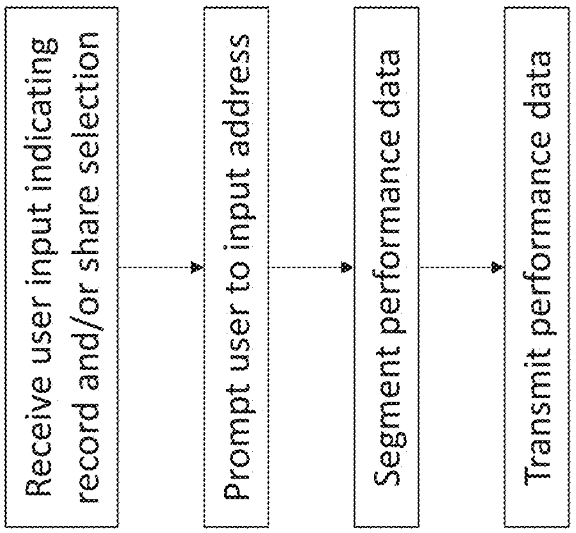
FIG. 10 is a flow chart with exemplary logic for sharing the performance data for the system of FIG. 1A.
Figure 11:
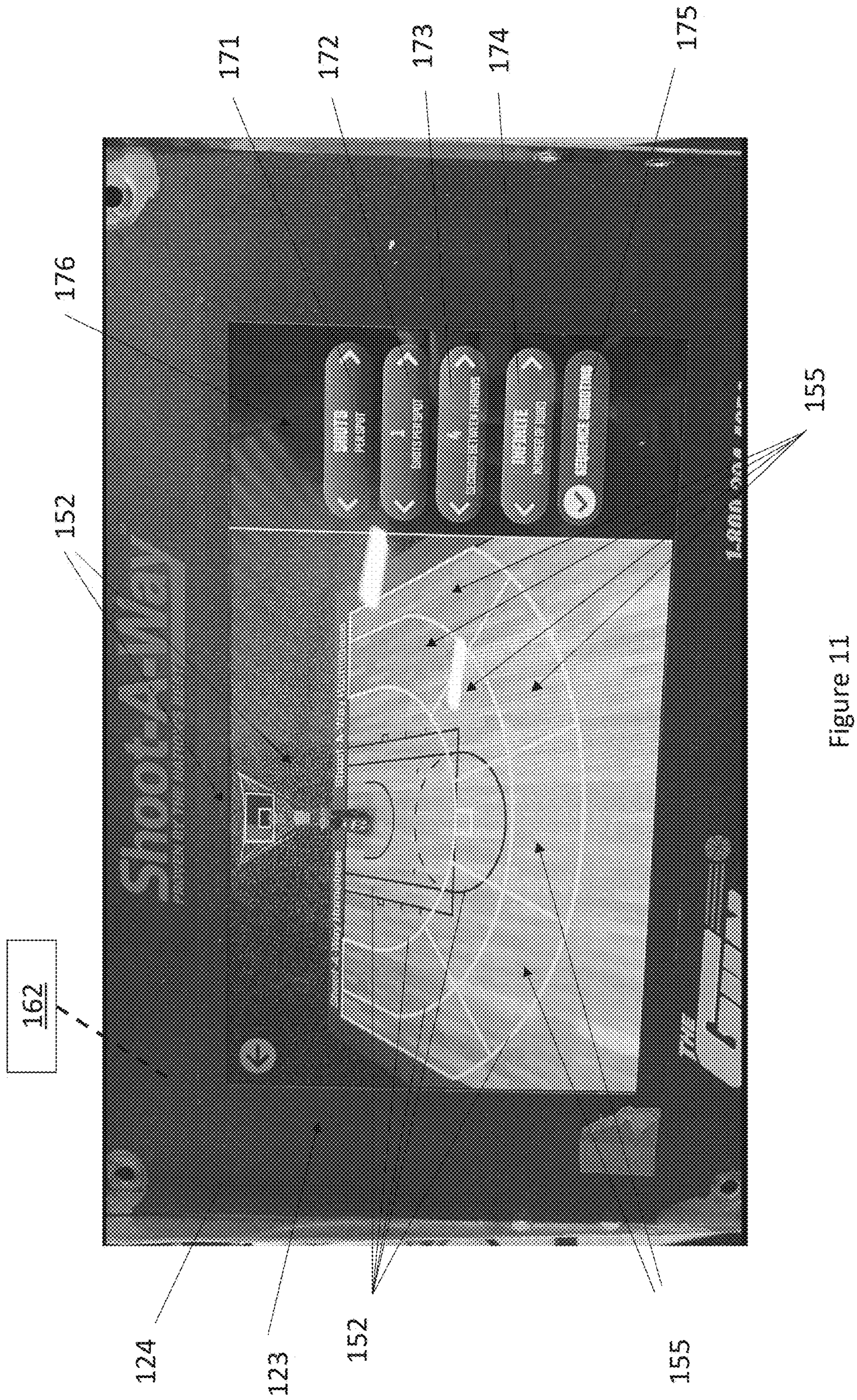
FIG. 11 is a front view of another exemplary user interface for use with the system of FIG. 1A.
Figure 12:
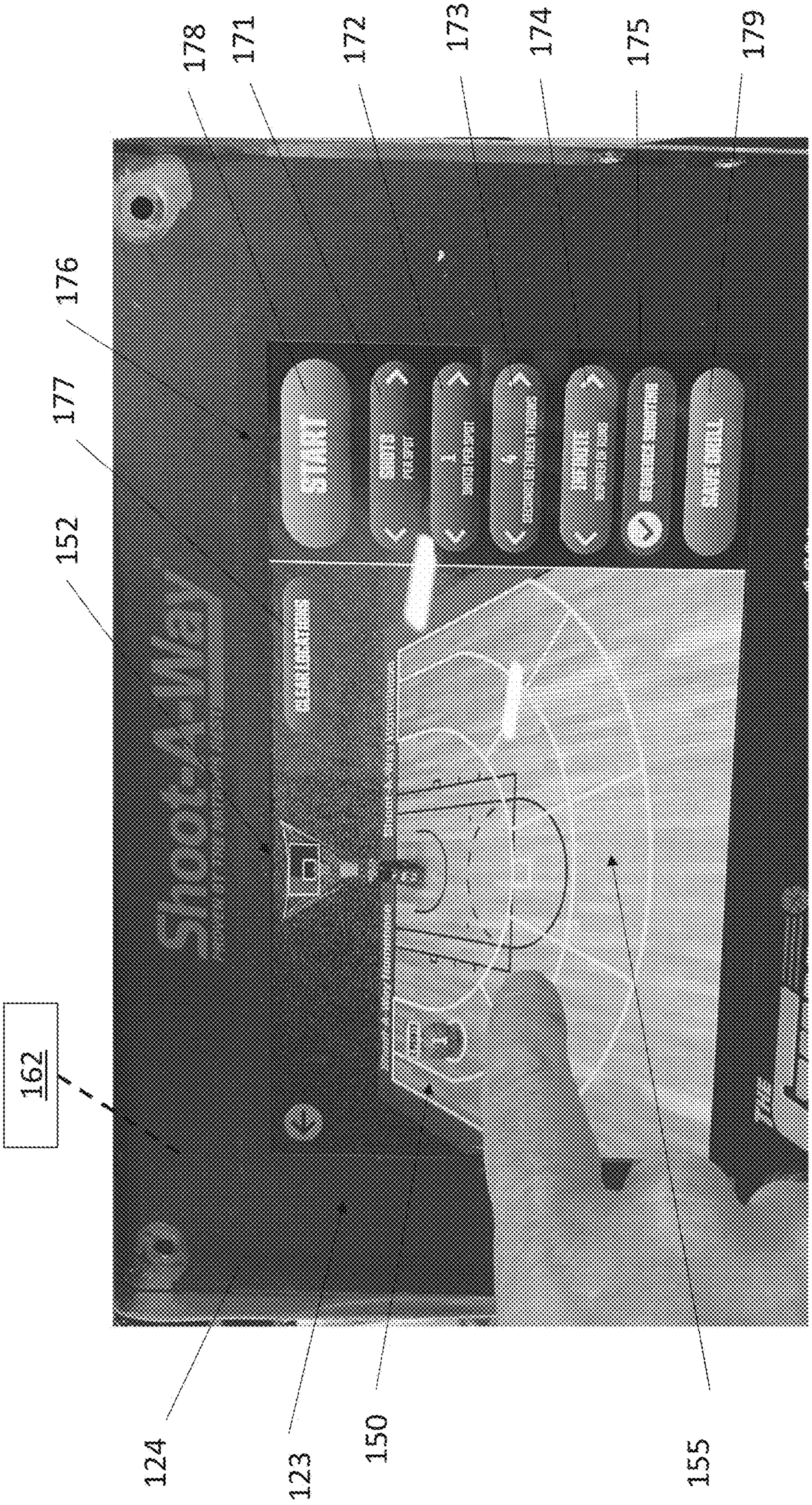
FIG. 12 is a front view of the exemplary user interface of FIG. 11 with exemplary user interaction.
Figure 13:
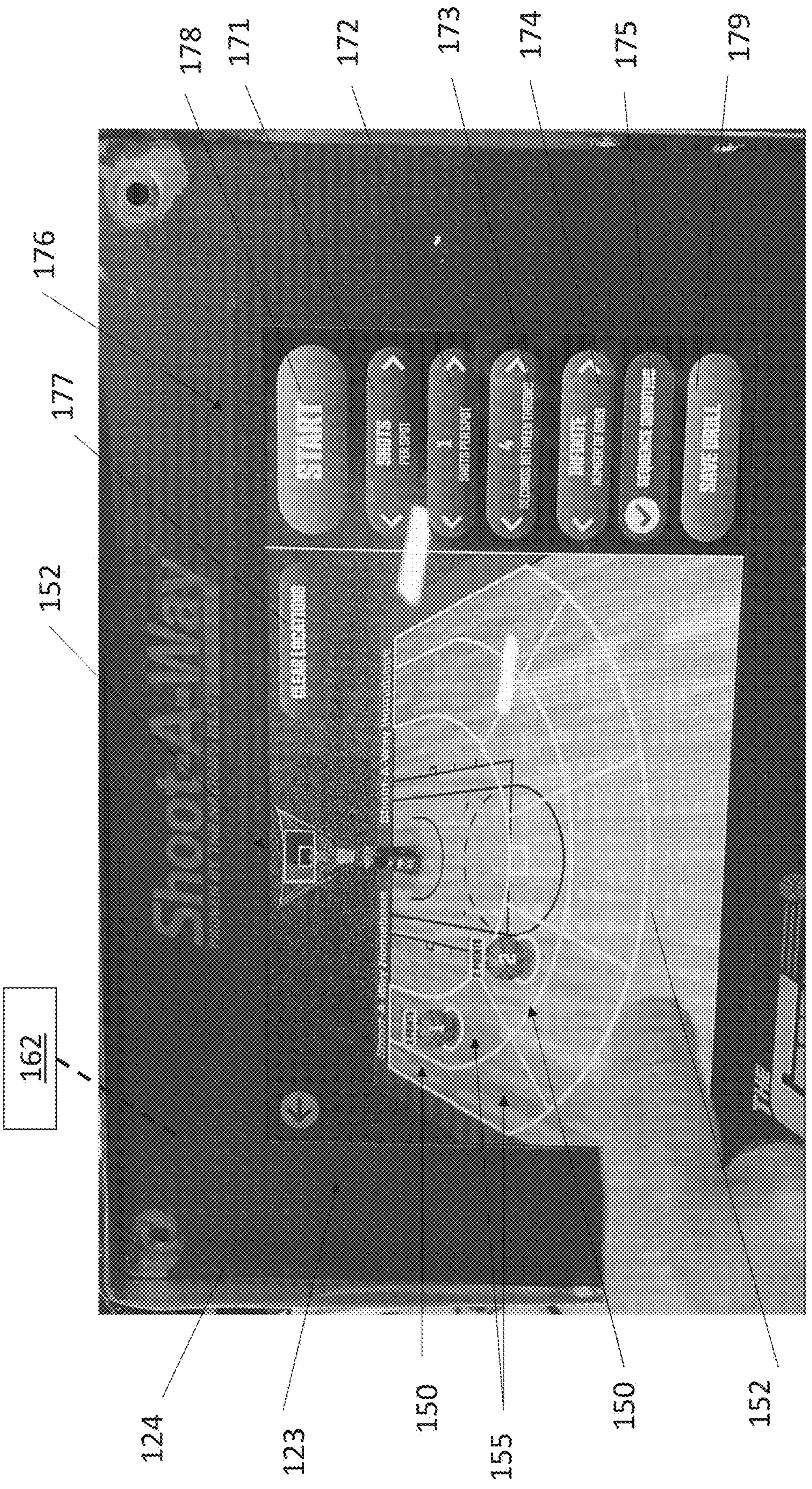
FIG. 13 is a front view of the exemplary user interface of FIG. 11 with exemplary user interaction.
Figure 14:
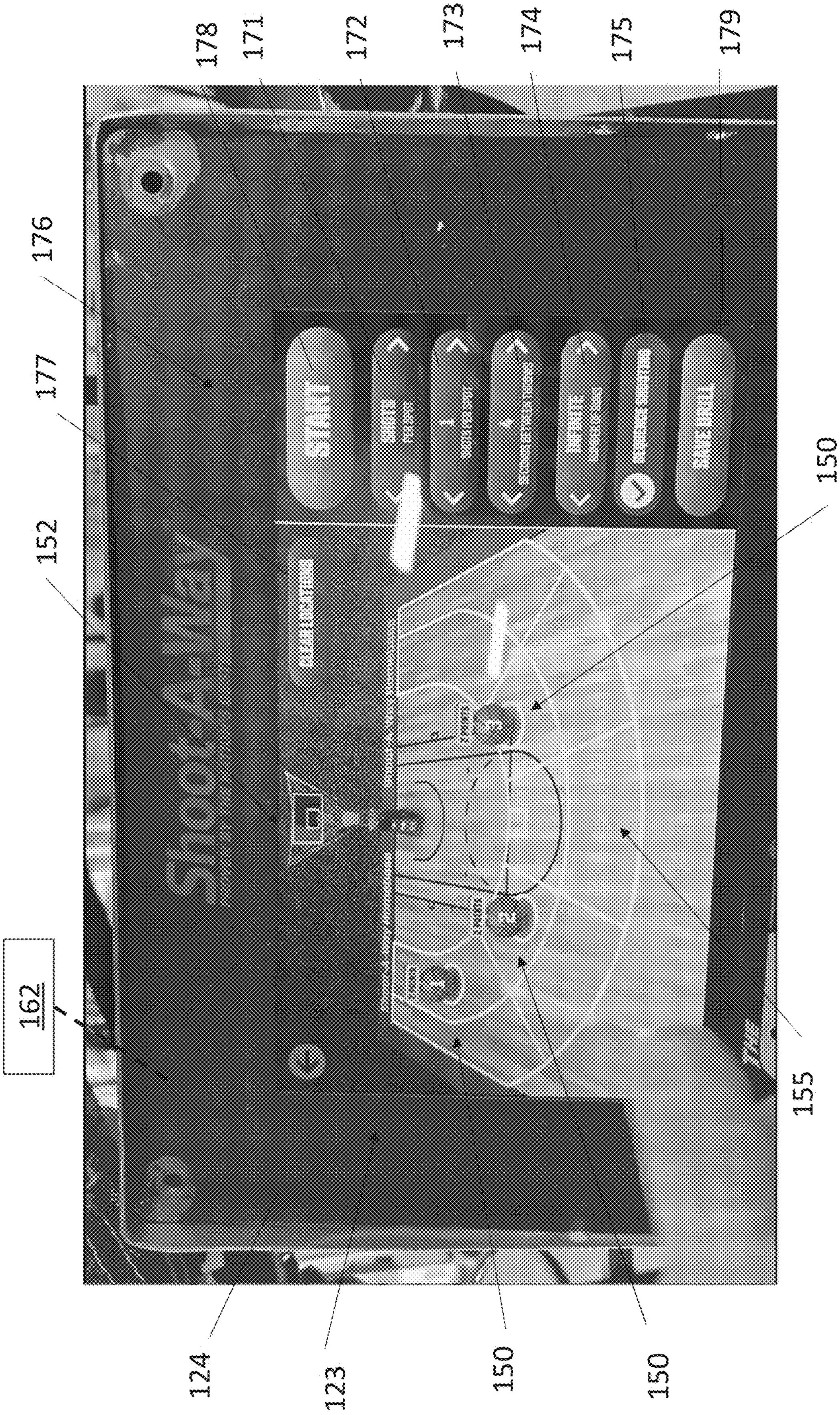
FIG. 14 is a front view of the exemplary user interface of FIG. 11 with exemplary user interaction.

FIG. 10 is a flow chart with exemplary logic for sharing performance data. A user may be prompted, such as at the interface 124, with an option to record their performance. A user may be prompted, such as at the interface 124, with an option to share their performance. Selecting the record and/or share option(s) may cause the basketball passing machine 100 to begin creating performance data as shown and discussed herein, particularly with respect to at least FIG. 9, for example, without limitation. Such performance data may be stored at the controller 162 and/or one or more local or remote databases.

Upon selection of the share and/or record feature, the user may be prompted to enter an address for sending of the performance data. The address may be an email address, network address, cell phone number, some combination thereof, or the like. The performance data may be transmitted to the address. The performance data may be segmented as required and sent in multiple parts to accommodate size restrictions or servers, devices, or the like. Alternatively, or additionally, the transmission may comprise a message with a link to view and/or download the performance data.

In exemplary embodiments, the creation and recording of performance data may begin automatically upon programming of the basketball machine 100 to initiate a practice session. In such embodiments, the performance data may be automatically deleted following the shooting session, or after a predetermined amount of time, if a share request is not received. In other exemplary embodiments, the creation and recording of performance data may not begin unless a record request is received. The performance data may be automatically deleted following the shooting session or after a predetermined amount of time, if a share request is not received.

The record and/or share selections and related prompts may be provided at the user interface 124, though such prompts may be provided elsewhere. For example, without limitation, a dedicated record button or icon and a dedicated share button or icon may be provided. The buttons may be physically separate buttons or icons, or selectable areas with indications designating the same at the user interface 124.

Images may comprise one or more individual images, videos, video clips, some combination thereof, or the like.

FIG. 11 through FIG. 19 illustrate another exemplary interface display 123 for use with the basketball launching device 100. A number of selection areas 155 may be positioned about the user interface 124 and may be defined, at least in part, by the visual depictions 152. In exemplary embodiments, user selection anywhere within a given one of the selection areas 155 may cause the user interface 124 to record the user's desire to receive a pass at the given selection area 155. For example, without limitation, user selection of any point within a given selection area 155 may be configured to cause the basketball launching device 100 to launch a basketball to a single, common point on the basketball playing area corresponding with the given selection area 155. So, for example without limitation, if two pass receipt locations 150 are selected within the given selection area 155, two passes may be made to substantially the same pass receipt location 150 at the basketball playing area. In this way, programming and operation of the basketball launching device 100 may be simplified.

In other exemplary embodiments, the selection areas 155 may be provided solely for user convenience and reference and the basketballs may be passed approximately to their respective location on the basketballs playing area corresponding with selected pass receipt locations 150. So, for example without limitation, if two pass receipt locations 150 are selected within a given selection area 155, two passes may be made to different locations within the same pass receipt location 150 at the basketball playing area. In this way, programming and operation of the basketball launching device 100 may be made more precise.

The user interface 124 may be configured to receive a user selection of pass receipt locations 150 on the basketball playing surface for the launcher to pass the basketballs to. User selection may be made by direct, physical touch, such as by use of a touch screen or a panel with physically depressible buttons, or by way of one or more tools, such as but not limited to, the selection tool 153 shown and/or described with respect to FIG. 3. Various pass receipt locations 150 about the user interface 124 may be selected by the user. The pass receipt locations 150 may be selected with reference to one or more elements of the visual depiction 152 so that the user knows where to stand on the actual basketball playing area to receive the corresponding passes. For example, without limitation, if the user selects a pass receipt location 150 near the foul line, the user may then stand near the foul line (real or imaginary) to receive a corresponding pass. Any number and pass receipt locations 150 of such pass receipt locations 150 may be selected to create one or more customized basketball practice routines.

The pass receipt locations 150 selected by the user may be displayed and updated as they are selected. For example, without limitation, the pass receipt locations 150 may be illuminated, darkened, colorized, decolorized, highlighted, changed, or otherwise altered upon selection. Alternatively, no such pass receipt locations 150 may be displayed and the user's touch at a given point may cause a pass receipt location 150 to be displayed as selected. For example, without limitation, the pass receipt locations 150 may appear upon selection. The pass receipt locations 150 may be displayed as icons, buttons, indicia, combinations thereof, or the like. The pass receipt locations 150 may comprise digital representations displayed on a screen (e.g., electronic icons) or physically depressible buttons on a panel, to name a few examples. The pass receipt locations 150 may be displayed as a basketball, though any graphical representation may be utilized.

The pass receipt locations 150 may comprise a number, alphanumeric character, or other representation corresponding to the order in which the passes will be made (e.g., the first pass going to the pass receipt locations 150 labeled with a "1", "A", or the like, the second pass to number "2", "B", or the like, and so forth). Initially, the pass receipt locations 150 may be labeled with an order based on the order they were selected. The pass receipt locations 150 may be labeled with a corresponding score to be recorded if a shot is successfully made from a pass associated with the pass receipt location 150. In exemplary embodiments, the points vary based on distance from the visual depiction 152 of the launcher 100 and/or the basketball goal. For example, without limitation, two points may be recorded for all pass receipt locations 150 in front of the visual depiction 152 of the three-point line and three points may be recorded for all pass receipt locations 150 behind the visual depiction 152 of the three-point line, though any scoring scheme may be utilized.

Figure 15:
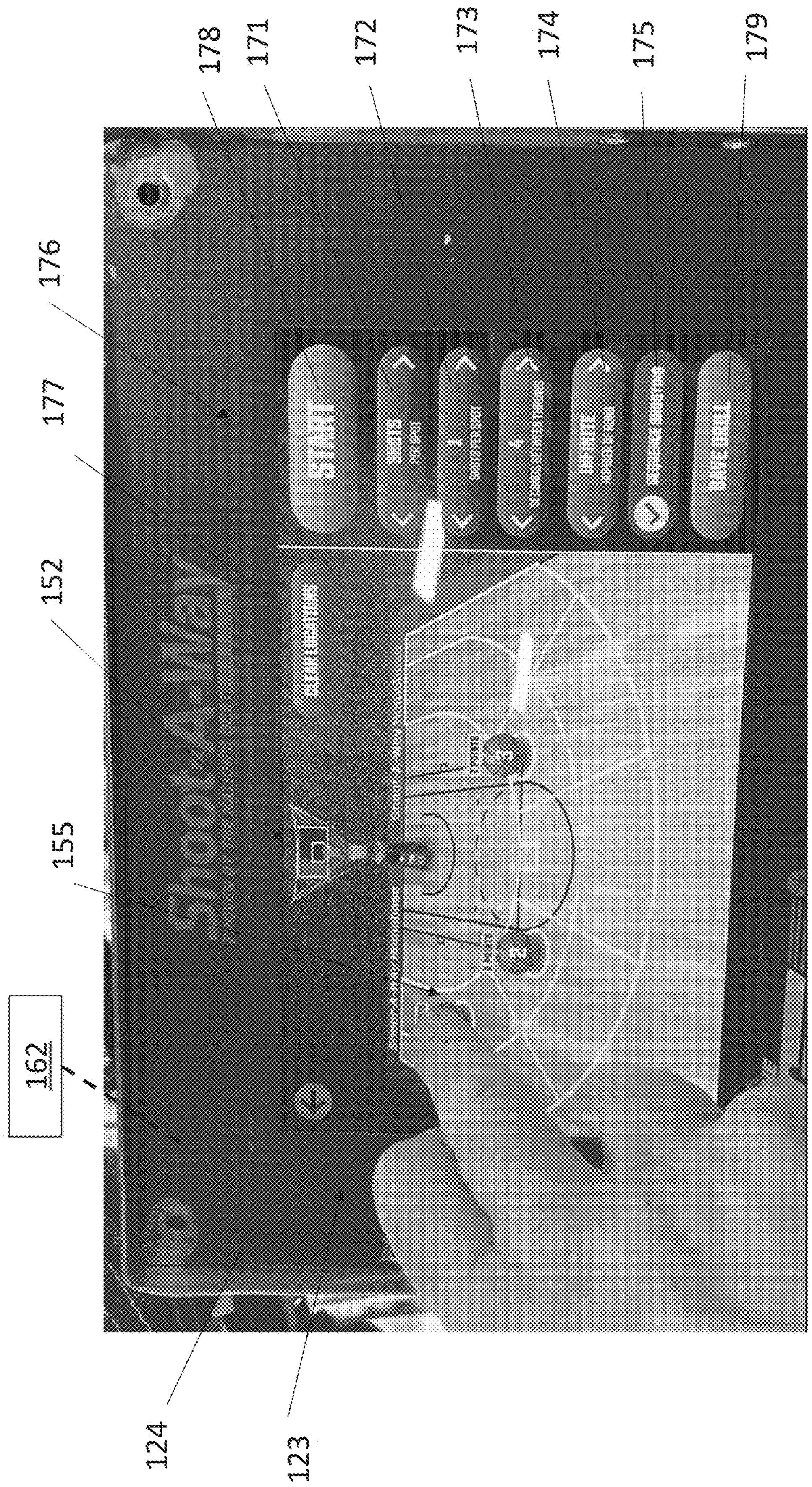
FIG. 15 is a front view of the exemplary user interface of FIG. 11 with exemplary user interaction.
Figure 16:
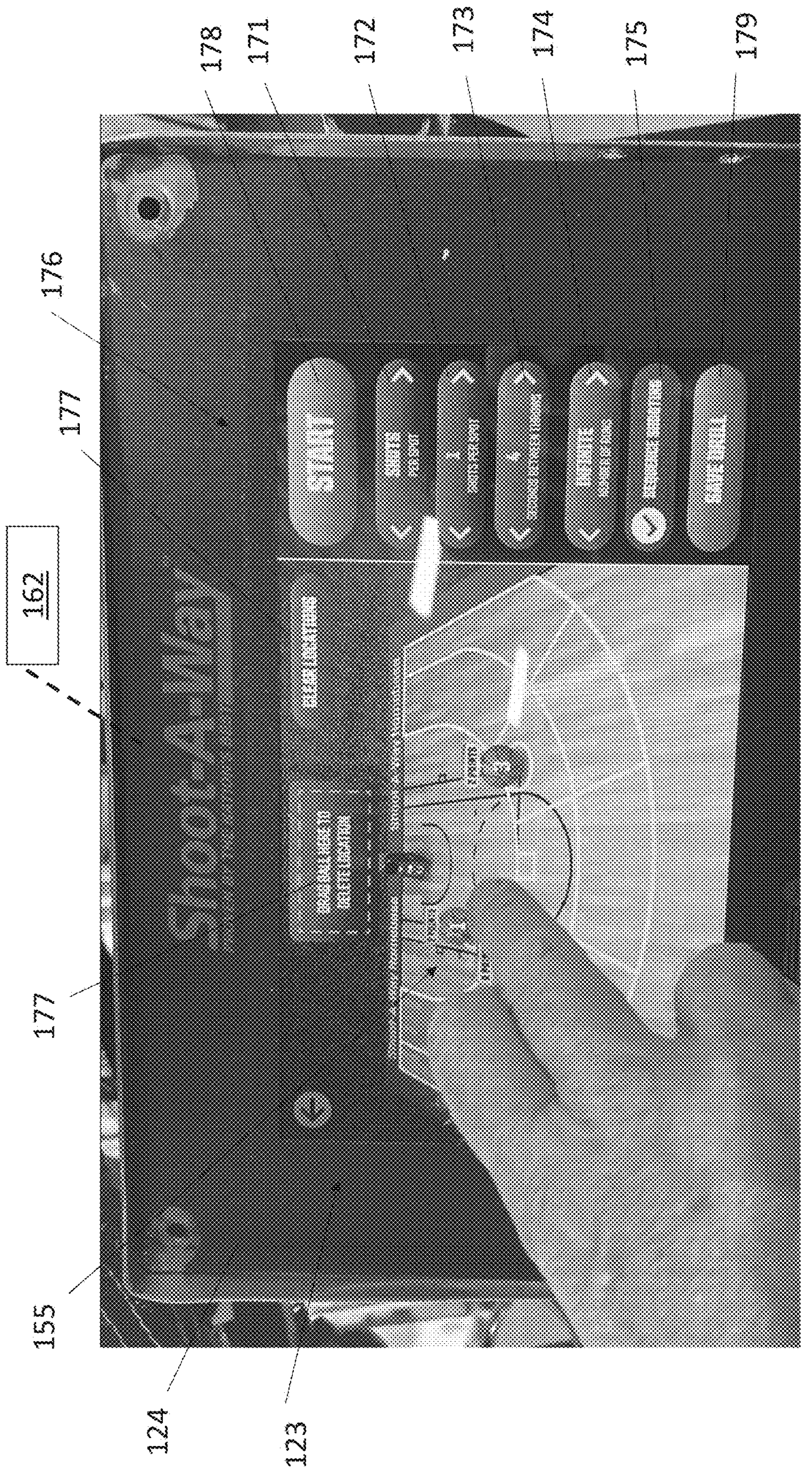
FIG. 16 is a front view of the exemplary user interface of FIG. 11 with exemplary user interaction.
Figure 17:
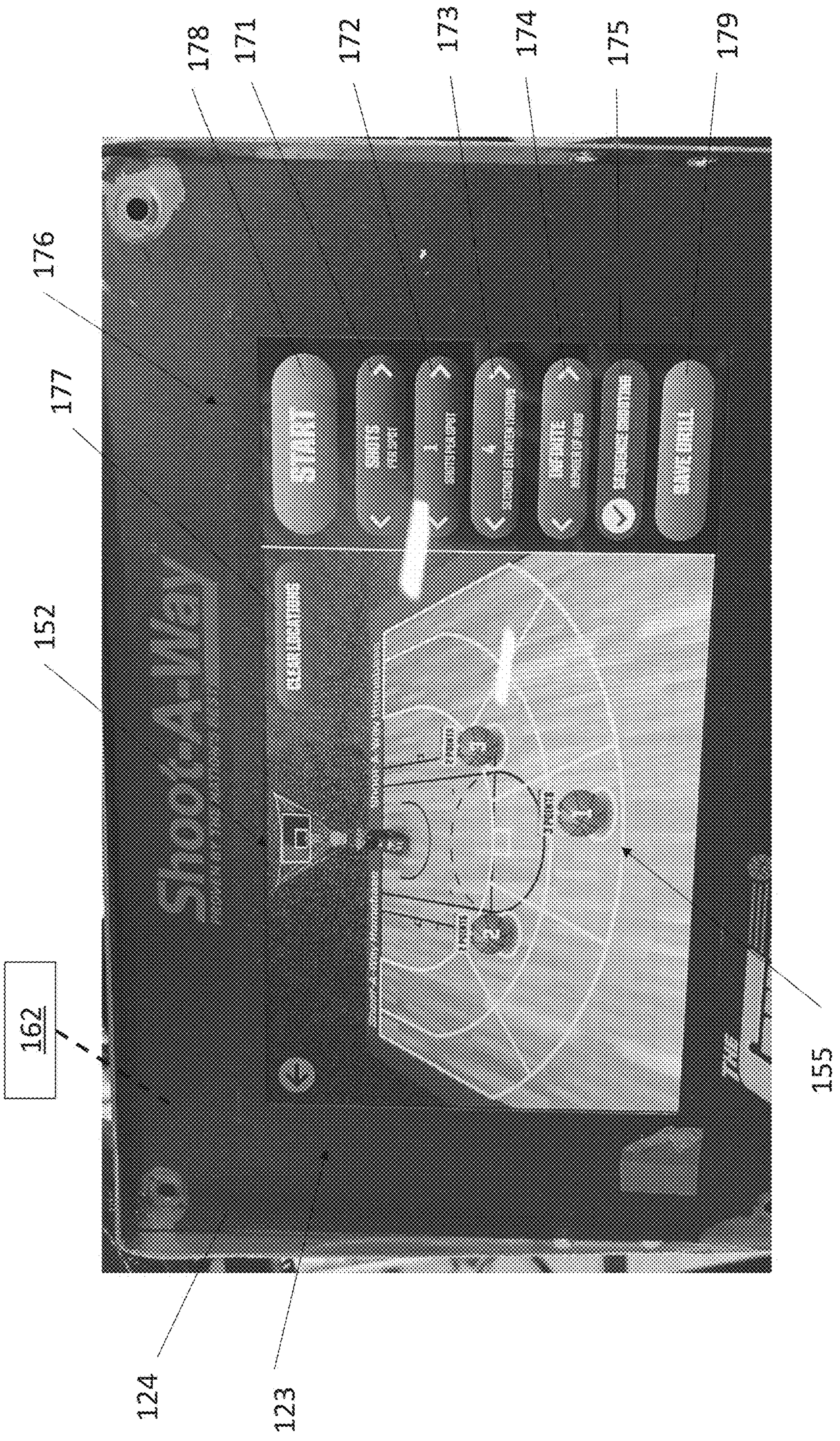
FIG. 17 is a front view of the exemplary user interface of FIG. 11 with exemplary user interaction.
Figure 18:
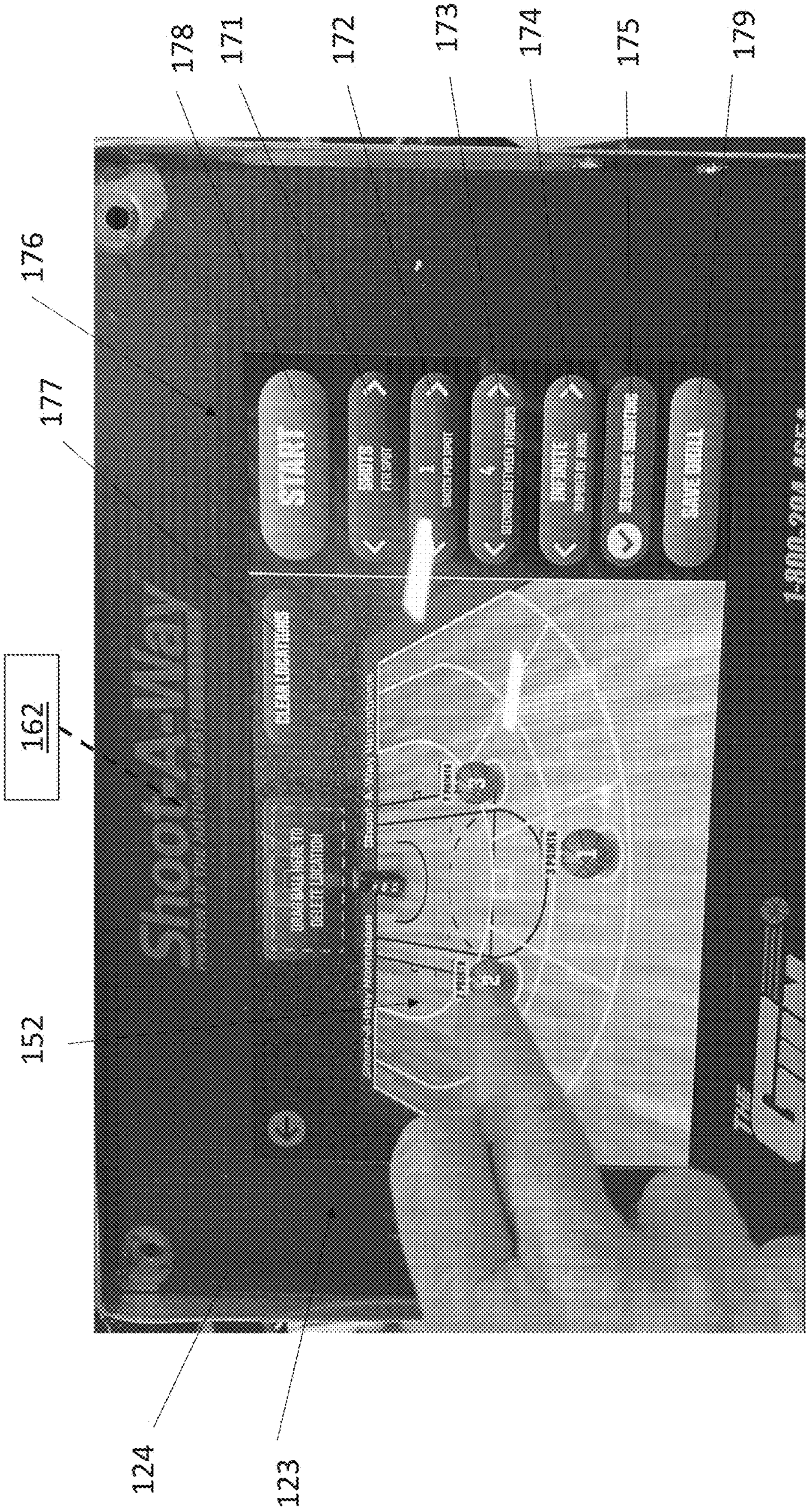
FIG. 18 is a front view of the exemplary user interface of FIG. 11 with exemplary user interaction.
Figure 19:
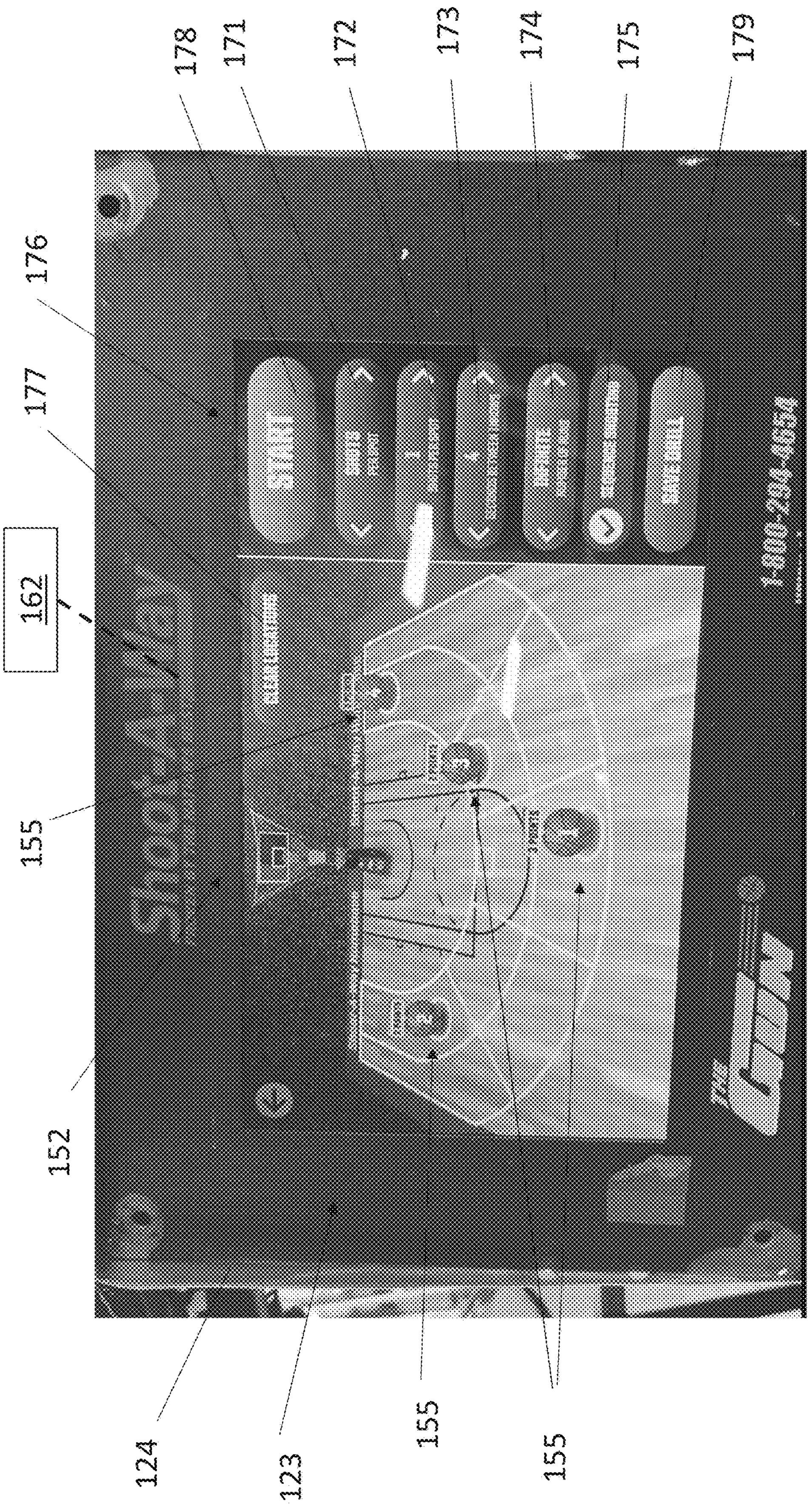
FIG. 19 is a front view of the exemplary user interface of FIG. 11 with exemplary user interaction.

FIGS. 11-14 illustrate exemplary programming of three exemplary pass receipt locations 150 at the user interface 124. The user interface 124 may be configured to permit revision of the pass receipt locations 150 after their initial selection, such as before the launcher 100 begins launching the basketballs, during the practice session, or after the practice session is completed. For example, without limitation, a given one of the pass receipt locations 150 may be moved from an initial pass receipt location 150 to a new pass receipt location 150. Such movement may be accomplished by a touch and drag technique. Such movement may, alternatively or additionally, be accomplished by a tap and drag technique, taping motion, swipe, click and drag technique, press and drag technique, combinations thereof, or the like. FIGS. 15-17 show the movement of a first pass receipt locations 150 from an initial spot on the left side of the key to a new spot near the top of the key. FIGS. 15-17 illustrate the user interface 124 updating the first pass receipt locations 150 from two points to three points based on its location relatively to the visual depictions 152. FIGS. 17-19 illustrate, for example without limitation, movement of a second one of the pass receipt locations 150 and addition of a fourth pass receipt locations 150. Any technique for moving the pass receipt locations 150 may be utilized. The user interface 124 may be used to create a vast number of custom practice routines.

A delete tool 177 may be provided to remove the selected one of the pass receipt locations 150. The delete tool 177 may be displayed or otherwise provided only upon selection of one or more of the pass receipt locations 150 in exemplary embodiments through such is not required. The delete tool 177 may comprise a defined area where the icon, button, symbol, indicia, or the like for the pass receipt locations 150 may be moved and result in its removal from the custom practice routine. In other exemplary embodiments, the delete tool 177 may normally be displayed or otherwise provided.

An options menu 176 may be provided at the user interface 124. In exemplary embodiments, the options menu 176 may be positioned adjacent to the visual depictions 152, though any location may be utilized. The options menu 176 may comprise a practice style option 171. The practice style option 171 may permit the user to choose between a number of programming options including, but not limited to, creation of a custom drill, use of a pre-programmed drill, a shots per location option, a makes in a row option, a made shots options, or the like. In the makes option, the controller 154 may program the launcher 100 to require indication of a number of shots made at a given selected pass receipt location 150 before the launcher 100 moves to the next selected pass receipt locations 150. In the makes in a row option, the controller 154 may program the launcher 100 to require indication of a number of shots in a row at a given selected pass receipt locations 150 before the launcher 100 moves to the next selected pass receipt locations 150. In the shots per location option, the controller 154 may program the launcher 100 to launch the number of passes selected at a shots per location option 172 to a given one of the selected pass receipt locations 150 before moving to the next selected pass receipt location 150. The shots per location option 172 may be updated to a number of made shots or number of made shots in a row option depending on the user selection made at the practice style option 171.

The indication of shots made or missed may be made by way of one or more sensors 160.

The options menu 176 may comprise a timing option 173. The timing option 173 may permit the user to select a time delay between passes.

The options menu 175 may comprise a number of runs options 174. The number of runs options 174 may permit the user to select a number of times the launcher 100 progresses through all of the selected pass receipt locations 150 before terminating the practice session.

The options menu 175 may comprise a sequence shooting option 175. The sequence shooting option 175 may permit the user to select between automatic renumbering of the order of the selected pass receipt locations 150 or ability to program a non-serial order of the selected pass receipt locations 150. Where the sequence shooting option 175 is not selected, for example, the order of the pass receipt locations 150 within the custom practice arrangements may by automatically renumbered such that the basketballs are always passed in a particular order, such as but not limited to from right to left, left to right, closest to furthest, further to closest, etc. Where the sequence shooting option 175 is selected, the order of the pass receipt locations 150 within the custom practice arrangement may remain unchanged such that they may be provided in a non-serial order.

After one or more pass receipt locations 150 are selected, a save option 179 may be provided at the options menu 176. The save option 179 may permit the user to save the created program for subsequent use. After one or more pass receipt locations 150 are selected, a start option 178 may be provided at the options menu 176. The start option 178 may permit the user to initiate the created program. In exemplary embodiments, selection of the start option 178 may cause the user interface 124 to communicate the selected pass receipt locations 150 forming the custom practice arrangements to the launcher 100, such as but not limited to, by way of the controller 154.

For those pass receipt locations 150 further from the launcher 100, the controller 162 may be configured to command the launching device 111 to automatically launch basketballs with greater force (thus causing their normal passing distance to increase), such as by way of the automatic distance adjustment mechanism 152. Likewise, for those pass receipt locations 150 closer to the launcher 100, the controller 162 may be configured to command the launching device 111 to automatically launch basketballs with less force (thus causing their normal passing distance to decrease), such as by way of the automatic distance adjustment mechanism 152.

Figure 20:
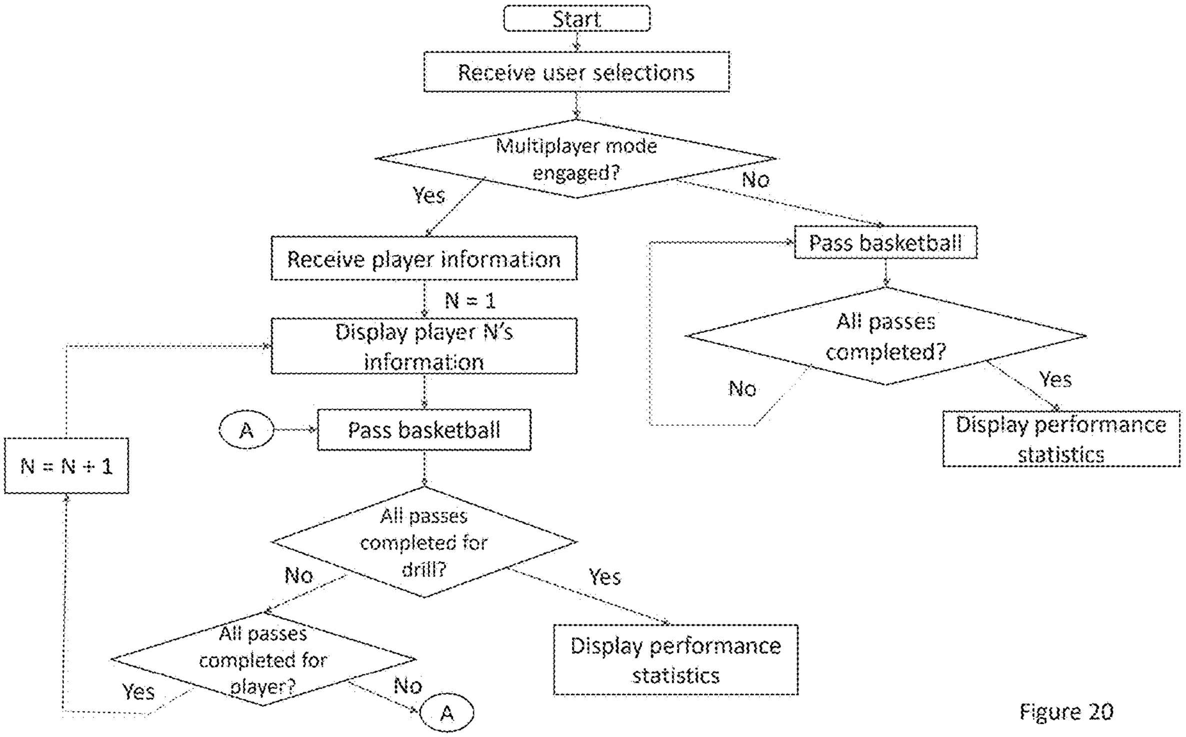
FIG. 20 is a flow chart with exemplary logic for a multi-player mode using the machines, systems, and/or figures of any of FIGS. 1-19.

FIG. 20 illustrates a flow chart for operating an exemplary multi-player mode with the machine 100. A controller 162 may be configured to accept user selections, which may include selection of a multiplayer mode. Such selections may be made at the user interface 124, such as at the machine 100 and/or remote electronic device 138 for example without limitation. In other exemplary embodiments, without limitation, the multiplayer mode may be automatically or manually engaged (e.g., by user selection) after a drill is otherwise programmed or underway, such as by way of revisions or updates to the programmed drill.

Where the multiplayer mode is engaged, information may be received for each participant. Such information may include, for example without limitation, player name, team information, user name, password or other login information, player order, combinations thereof, or the like. Such information may be manually entered. Logging-in may permit player information to be automatically associated with the drill by the controller 162. For example, without limitation, before, during, or after programming the drill and selecting the multi-user mode option, players may be logged into the machine 100 and/or their profiles selected for association with the drill. Such logging in or association may be performed at the user interface 124, such as at the machine 100 and/or remote electronic device 138 for example without limitation. Upon doing so, stored player information, such as name, team, geographic, facility, or other information, may be automatically retrieved by, or received at, the controller 162 for association with the drill and display at the front display 134, in exemplary embodiments without limitation.

The controller 162 may be configured to associate passes with participants. The controller 162 may be configured to associate a first set of passes with a first player, a second set of passes with the second player, and so forth. The passes may be the same for each player or different. For example, without limitation, two passes may be provided to each of locations 2, 6, 12, and 15 (see e.g., FIG. 3) for the drill. If three players are participating, the controller 162 may be configured to associate a first set of two passes to each selected location (so the first 8 passes) with player 1, a second set of two passes to each selected location (so the next 8 passes) with player 2, and third set of two passes to each selected location (so the final 8 passes) with player 3. As another example, without limitation, two passes may be provided to location 4 in association with player 1, five passes to locations 9 and 11 in association with player 2, and one pass to location 13 in association with player 1. The controller 162 may be configured to associate the first two and final pass with player 1 and the intervening 5 passes with player 2.

Of course, these are just some examples which are provided without limitation. A wide variety of custom or pre-programmed drills maybe performed using the muti-user mode for any number of participants. User selections for programming may include, for example without limitation, locations for pass receipt, a number of passes per location, an order of passes, an action to be performed before, after, or while receiving a pass, shooting locations, time between passes, combinations thereof, or the like may be selected by the user for the drill. Such selections may be made at the user interface 124, such as at the machine 100 and/or remote electronic device 138 for example without limitation.

The controller 162 may be configured to cause each player's name or other identifying information may be displayed, such as but not limited to, at a forward-facing electronic display 134 (hereinafter also the "front display" 134) when passes assigned to the player are about to be, are being, and/or just were provided by the launching device 111. In exemplary embodiments, without limitation, the participant information (e.g., player name) is displayed before a pass is commanded by the controller 162 and at least part of the time the pass is performed by the launching device 111. The participant information (e.g., player name) may be displayed during or after the pass is commanded by the controller 162 and/or performed by the launching device 111. Such display may continue so long as passes are designated for the participant. Alternatively, or additionally, the player information may be displayed for a period of time and then a new display with the same or different player information, as appropriate, is provided.

In this manner, the players may be able to easily ascertain whose turn it is to participate in the drill. Once all passes assigned to a given participant are exhausted, the controller 162 may be configured to cause a next participant's name or other identifying information for other identifying information may be displayed, such as but not limited to, at the front display 134, and so forth, for each participant.

The passes provided to each participant may be the same, or different from one another. In this fashion any number and/or type of passes, pass receipt locations, shooting locations, drill types, combinations thereof, or the like may be assigned to each participant.

Partially or fully programmed drills may be edited, including while a drill is in progress. Such editing may be performed at the user interface 124, by way of non-limiting example. Such editing may include, by way of non-limiting example, reassigning passes to different participants, adding participants, removing participants, engaging/disengaging multiplayer mode, moving pass locations, moving shooting locations, changing pass type, combinations thereof, or the like.

Performance statistics may be displayed, including but not limited to, at the front display 134, at the interface 124, at the remote electronic device 138, combinations thereof, or the like. Performance statistics may be provided, for example without limitation, during and/or after each pass, round of passes, player participation, drill, combinations thereof, or the like. For example, without limitation, a player's performance statistics may be displayed upon complete of a set of passes for that player and before a next player begins his or her turn. Alternatively, or additionally, summary information for all participants may be provided upon completion of a drill. The summary information may be cumulative for all participants, individual for each participant, combinations thereof, or the like.

Provided performance information may be specific to the participant, specific to the drill, cumulative for all participants, team specific, facility specific, historical, combinations thereof, or the like. Performance statistics may include, for example without limitation, player success/failure rate is making basketball shots (e.g., in numerical ratio form, such as percentages or raw statistics (e.g., X/Y), number of passes made, number of shots made, pass receipt locations, shooting locations, drill type information, combinations thereof, or the like. Such statistics may be provided with player, team, facility, coach information, combinations thereof, or the like.

Were the multiplayer mode is not engaged, programming and/or operation may proceed normally.

Programmed drills may be saved to one or more libraries, such as electronically stored at the machines 100 or remote therefrom. Stored drills may be recalled at the same or different machines 100 and/or may be remotely edited, such as by way of the remote electronic devices 138. Libraries may be player specific, facility specific, machine specific 100, team specific, global, combinations thereof, or the like, though such is not required. Stored drills, including but not limited to multi-player drills, may be assigned to various participants, such as by way of login information, player profile, or the like. This may permit added forms or virtual coaching.

Participants may be individually logged into and/or out of the machines 100 and/or may be logged into and/or out of the machines 100 as a group (e.g., team). Information for all logged-in or otherwise registered participants (e.g., as one or more lists) may be displayed, such as at the front display 134, user interface 124, and/or remote electronic devices 138, for example without limitation.

Figure 21:
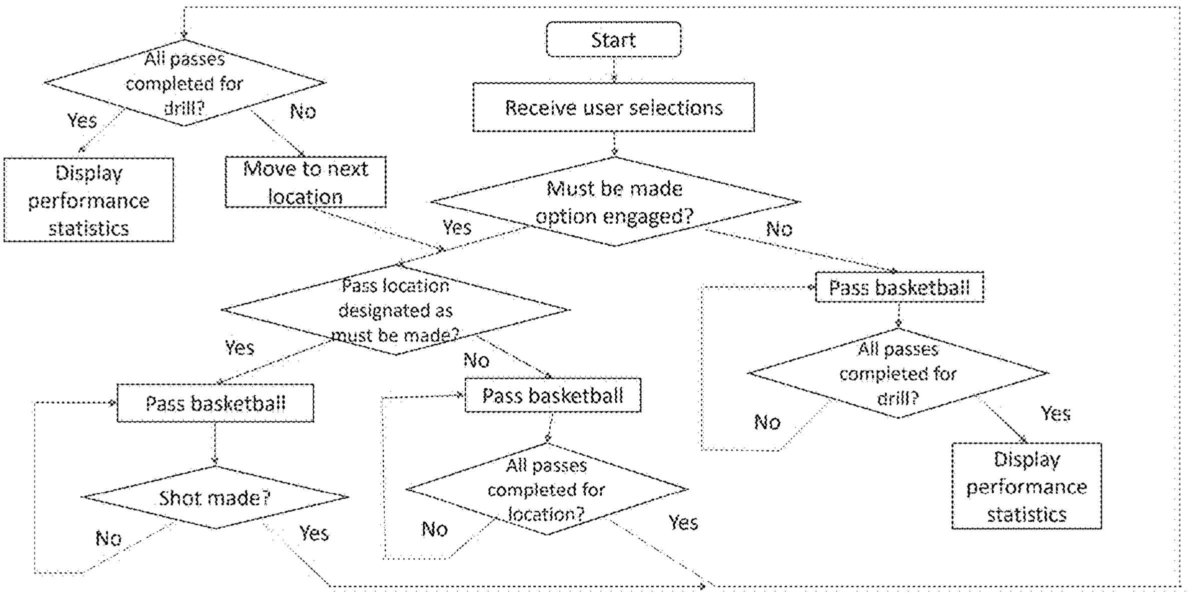
FIG. 21 is a flow chart with exemplary logic for a must-be-made option using the machines, systems, and/or figures of any of FIGS. 1-20.

FIG. 21 illustrates an exemplary must-be-made mode. The must-be-made mode may be used in conjunction with, or separate from, the multi-user mode.

The controller 162 may be configured to provide an option for a must be made mode. Selecting the must be made mode option may permit a user to program one or more pass and/or shooting locations as those which must be made before the machine 100 may progress to another location.

Such selections may be made at the user interface 124, such as at the machine 100 and/or remote electronic device 138 for example without limitation.

The controller 162, when in the must be made mode is engaged, may be configured to continue to pass basketballs to a must-be-made designated pass location until information is received, such as from the sensor(s) 160, that a shooting attempt was made in association with the must-be-made designated pass location. The requirement to make a single or multiple shots at the must-be-made designated pass locations may be programmed. The must-be-made designation may be provided for some or all locations, some or all participants, combinations thereof, or the like.

While display performance statistics or similar may be provided at the flow charts, such as in FIGS. 19-20, after all passes are completed, the display of performance statistics may, alternatively or additionally, be performed at any stage, such as while a drill is underway. While display player information may be provided at the flow charts, such as in FIGS. 19-20, before passing, the display of participant information may, alternatively or additionally, be provided at any time, such as while or after a pass is made.

The steps and order show and/or described are merely exemplary and are not intended to be limiting. Certain steps may be added, removed, omitted, reordered, and/or repeated.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphones, tablets, databases, servers, or the like. The electronic connections and transmissions described herein may be accomplished by wired or wireless means. The electronic devices, including but not necessarily limited to the electronic storage devices, databases, controllers, or the like, may comprise and/or be configured to hold, solely non-transitory signals.

What is claimed is:

1. A basketball passing machine providing virtual coaching capabilities, said system comprising:

a launching device configured to pass basketballs to locations at a basketball playing area;

a user interface for receiving user input for programming custom practice sessions; and a controller in electronic communication with said launching device, said user interface, and a remote camera separate a od spaced apart from the basketball passing machine, wherein said controller comprises one or more non-transitory electronic storage devices comprising software instructions, which when executed, configure one or more processors to:

receive a video taken by the remote camera;

store the video at the one or more non-transitory electronic storage devices;

generale a prompt to play the video at the user interface;

receive data from the user interface indicating selection of the prompt, and in response, cause said video to be displayed at the user interface;

after playing the video at e user interface generate one or more programming prompts for programming custom practice sessions; and receive data from the user interface indicating user selections at the user interface in said one or more programming prompts for programming a particular custom practice session in accordance with the video, and in response, command said launching device to pass the basketballs to at least some of the locations at the basketball playing area in accordance with the user selections as part of said particular custom practice session.

2. The basketball passing machine of claim 1 further comprising:

a housing for the launching device;

a detector in electronic communication with said controller for detecting made basketball shots;

an electronic display provided at a forward-facing surface of the housing, wherein said software instruction stored at said one or more non-transitory electronic storage devices, when executed, configure said one or more processors to:

derive performance statistics for said particular custom practice session based, at least in part, on data received from said user interface and said detector; and display performance statistics for said particular custom practice session at the electronic display and update the performance statistics while the particular custom practice session is underway.

3. The basketball passing machine of claim 2 further comprising:

a local camera mechanically affixed, directly or indirectly, to the forward-facing surface of the housing, and in electronic communication with said controller and configured to record images of user attempting basketball shots following receipt of basketball passes from said launching device as part of said particular custom practice session.

4. The basketball passing machine of claim 3 wherein:

said launching device and housing are configured for rotational movement to face in various directions; and said electronic display and the local camera are configured for rotational movement with said launching device to face in a same direction as said launching device.

5. The basketball passing machine of claim 4 wherein:

the user interface comprises a touch sensitive electronic display; and the user interface is located at a side surface of said housing.

6. The basketball passing machine of claim 4 wherein:

said software instruction stored at said one or more non-transitory electronic storage devices, when executed, configure said one or more processors to visually indicate user-selected pass locations at the user interface for the particular custom practice session.

7. The basketball passing machine of claim 6 wherein: said user-selected pass locations are visually represented at said user interface by graphical demarcations or icons arranged about a visual depiction of one or more basketball court elements to visually correspond with said locations at said basketball playing area.

8. The basketball passing machine of claim 7 wherein: the one or more basketball court elements comprise a basketball key, a basketball three-point arc, a base line, and a basketball goal.

9. The basketball passing machine of claim 1 further comprising:

a local camera mechanically affixed, directly or indirectly, to the forward-facing surface of the housing, and in electronic communication with said controller and configured to record images of user attempting basketball shots following receipt of basketball passes from said launching device as part of said particular custom practice session, wherein said launching device and housing are configured for rotational movement to face in various directions, wherein said electronic display and the local camera are configured for rotational movement with said launching device to face in a same direction as said launching device, and wherein said controller is configured to transmit said recorded images of said user attempting basketball shots to a remote electronic device comprising said remote camera.

10. The basketball passing machine of claim 9 wherein: the remote electronic device comprises a smartphone, laptop, personal computer, or tablet.

11. The basketball passing machine of claim 10 further comprising:

a detector in electronic communication with said controller and configured to detect made basketball shots, wherein said software instruction stored at said one or more non-transitory electronic storage devices, when executed, configure said one or more processors to:

derive performance statistics for said particular custom practice session based, at least in part, on data received from said user interface and said detector; and display performance statistics for said particular custom practice session at an electronic display and update the performance statistics while the particular custom practice session is underway.

12. The basketball passing machine of claim 11 wherein: said electronic display is part of a remote electronic device comprising the remote camera, said remote electronic device comprising a smartphone, laptop, personal computer, or tablet.

13. The basketball passing machine of claim 11 wherein: said detector comprises a mechanical flapper.

14. The basketball passing machine of claim 1 further comprising:

a collection net for collecting the basketballs and returning them to the launching device;

a frame supporting at least said collection net and said launching device; and wheels connected to said frame for moving said machine about said basketball playing area.

15. A basketball passing machine providing virtual coaching capabilities, said system comprising:

a launching device configured to pass basketballs to locations at a basketball playing area;

a housing for the launching device;

a detector for detecting made basketball shots;

an electronic display provided at a forward-facing surface of the housing;

a user interface for receiving user input for programming custom practice sessions, wherein said user interface compromises a touch-sensitive electronic display;

a local camera mechanically affixed, directly or indirectly, to the forward-facing surface of the housing, and in electronic communication with said controller and configured to record images of user attempting basketball shots following receipt of basketball passes from said launching device as part of said particular custom practice session; and a controller in electronic communication with said launching device, said user interface, said detector, and a remote camera, separate and spaced apart from the basketball passing machine, wherein said controller comprises one or more non-transitory electronic storage devices comprising software instructions, which when executed, configure one or more processors to:

receive a video taken by the remote camera of a remote electronic device, said video comprising instructions for a user of the basketball passing machine;

in response, store the video at said one or more non-transitory electronic storage devices;

generate a prompt to play the video at the user interface;

receive data from the user interface indicating user selection of the prompt, and in response, recall the video from the one or more non-transitory electronic storage devices and cause said video to be displayed at the user interface for said user to view;

receive data indicating user selections at the user interface in response to said one or more programming prompts indicating user selections for programming a particular custom practice session in accordance with the video; and in response, command said launching device to pass the basketballs to at least some of the locations at the basketball playing area in accordance with the user selections as part of said particular custom practice session, including commanding said launching device to rotate to face in various directions to deliver the basketballs, wherein said housing, said electronic display, and said local camera are configured for movement with said launching device.

16. The basketball passing machine of claim 15 wherein: said one or more non-transitory electronic storage devices comprise additional software instructions, which when executed, configure said one or more processors to:

derive performance statistics for said particular custom practice session based, at least in part, on data received from said user interface and said detector; and display performance statistics for said particular custom practice session at the electronic display and update the performance statistics while the particular custom practice session is underway.

17. A method of providing virtual coaching capabilities, said method comprising:

providing a basketball passing machine comprising:

a launching device configured to pass basketballs to locations at a basketball playing area;

a user interface for receiving user input for programming custom practice sessions; and a controller in electronic communication with said launching device, said user interface, and a remote camera separate and spaced apart from the basketball passing machine:

electronically and automatically, including by execution of software instructions stored at one or more non-transitory electronic storage devices of the controller, which when executed configure operation of one or more processors:

receiving a video taken by the remote camera;

after receiving the video, storing the video at the one or more non-transitory electronic storage devices;

generating a prompt to play the video at the user interface;

receiving data from the user interface indicating user selection of the prompt, and in response, causing said video to be displayed at the user interface;

after causing said video to be displayed at the user interface, generating one or more programming prompts for programming custom practice sessions in accordance with said video;

in response, receiving data from the user interface indicating user selections for programming a particular custom practice session in accordance with the video; and after and in response to receiving the user selections at the user interface, commanding said launching device to pass the basketballs to at least some of the locations at the basketball playing area in accordance with the user selections as part of said particular custom practice session.

18. The method of claim 17 further comprising:

electronically and automatically, including by execution of the software instructions stored at one or more non-transitory electronic storage devices of the controller, which when executed configure operation of one or more processors:

after and/or while commanding said launching device to pass the basketballs, receiving images from a local camera forming part of the basketball passing machine; and after and/or while receiving images from the local camera, transmitting the images from the local camera to a remote electronic device comprising the remote camera.

19. The method of claim 18 wherein:

the basketball passing machine comprises a housing for the launching device; and the local camera is mechanically affixed, directly or indirectly, to the forward-facing surface of the housing.

20. The method of claim 19 further comprising:

electronically and automatically, including by execution of the software instructions stored at one or more non-transitory electronic storage devices of the controller, which when executed configure operation of one or more processors:

receiving data from a detector for detecting made basketball shots forming part of the basketball passing machine in electronic communication with said controller;

deriving performance statistics for said particular custom practice session based, at least in part, on data received from said user interface and said detector; and displaying said performance statistics for at an electronic display forming part of the remote electronic device and updating the performance statistics at the electronic display while the particular custom practice session is underway.

* * * * *